United States Patent [19]

Nitta et al.

[11] Patent Number: 5,781,660
[45] Date of Patent: Jul. 14, 1998

[54] IMAGE PROCESSING METHOD AND APPARATUS

[75] Inventors: Takashi Nitta; Mikio Aoki, both of Suwa, Japan

[73] Assignee: Seiko Epson Corporation, Tokyo, Japan

[21] Appl. No.: 508,860

[22] Filed: Jul. 28, 1995

[30] Foreign Application Priority Data

Jul. 28, 1995 [JP] Japan ................................. 6-177130

[51] Int. Cl.⁶ ............... G06K 9/34; G06K 9/46; G06K 9/48; G06K 9/66
[52] U.S. Cl. ............... 382/177; 382/173; 382/174; 382/195; 382/198; 382/289
[58] Field of Search ................... 382/173, 174, 382/177, 198, 289, 195

[56] References Cited

U.S. PATENT DOCUMENTS

| 4,809,351 | 2/1989 | Abramovitz et al. | 382/313 |
| 4,817,171 | 3/1989 | Stentiford | 382/195 |
| 5,054,091 | 10/1991 | Tanaka et al. | 382/177 |
| 5,307,422 | 4/1994 | Wang | 382/177 |
| 5,307,424 | 4/1994 | Kuehl | 382/198 |
| 5,335,294 | 8/1994 | Niki | 382/177 |
| 5,506,918 | 4/1996 | Ishitani | 382/289 |

FOREIGN PATENT DOCUMENTS

| 56-108175 | 8/1981 | Japan | G06K 9/20 |
| 59-8088 | 1/1984 | Japan | G06K 9/22 |
| 1-156887 | 6/1989 | Japan | |
| 3-250387 | 11/1991 | Japan | |

OTHER PUBLICATIONS

U.S. Patent Application Serial No. 08/499,537, filed Jul. 7, 1995, entitled *Information Input Device And Information Input Method*, Attorney's Docket No. P2254a.

*Primary Examiner*—Leo Boudreau
*Assistant Examiner*—Daniel Mariam
*Attorney, Agent, or Firm*—Michael T. Gabrik

[57] ABSTRACT

A method, apparatus and computer program product for extracting the line of text to be read, and compensating for any inclination or shifting in the column direction of the scanned character images, to improve the recognition ratio of the character recognition process. By extracting the characters at or near the column-direction center of plural meandering lines of scanned character images, the lines intended to be read for character recognition can be extracted based on the extracted characters. When there is shifting in the column direction between character images on the same scanned line, the amount of shifting is determined based on the inclination between the characters to compensate the shifting based on the obtained inclination. When the scanned character images are skewed relative to the column direction, a process minimizing the slope of the inclination is executed to compensate the inclination.

38 Claims, 16 Drawing Sheets

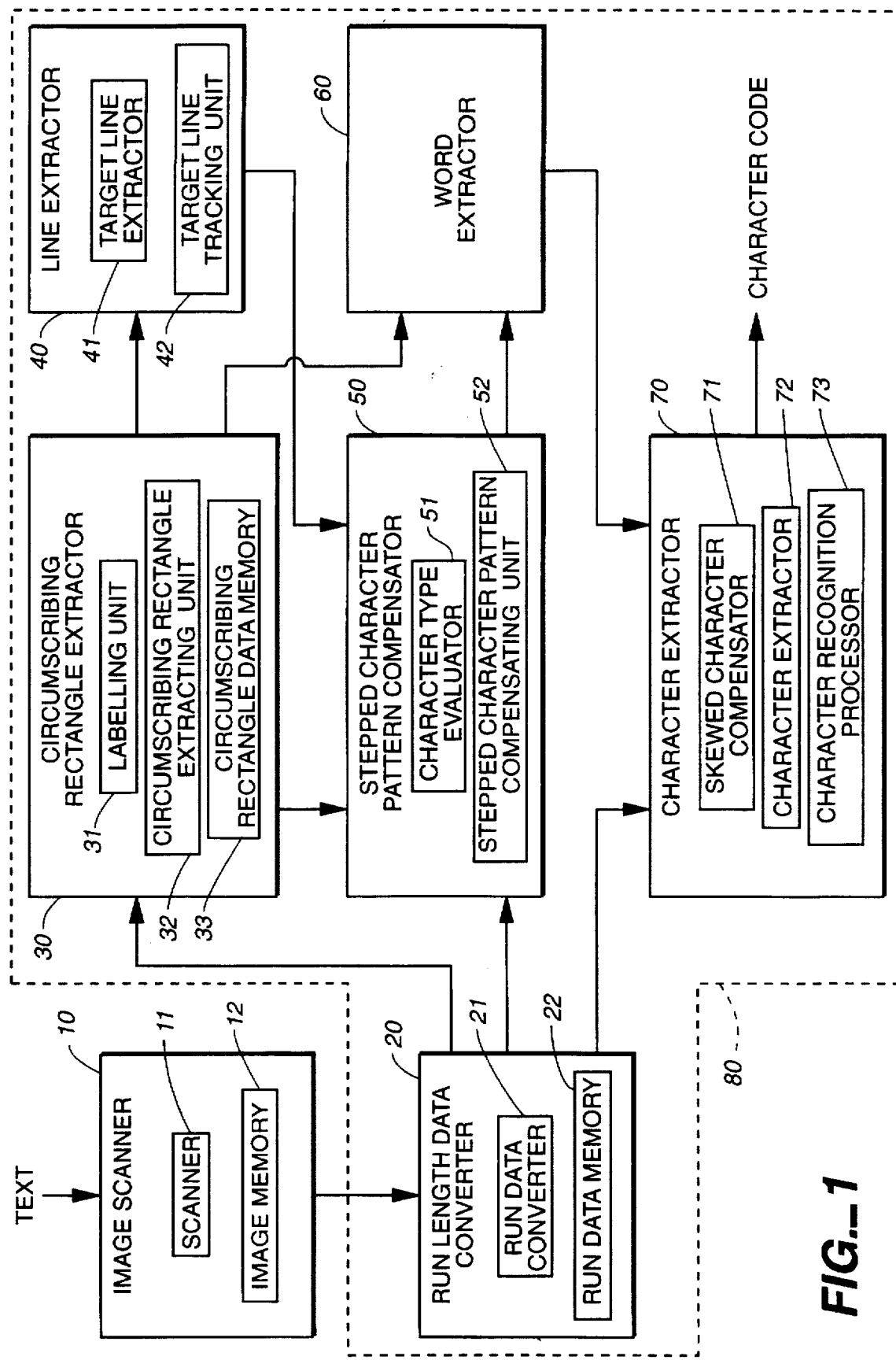
FIG._1

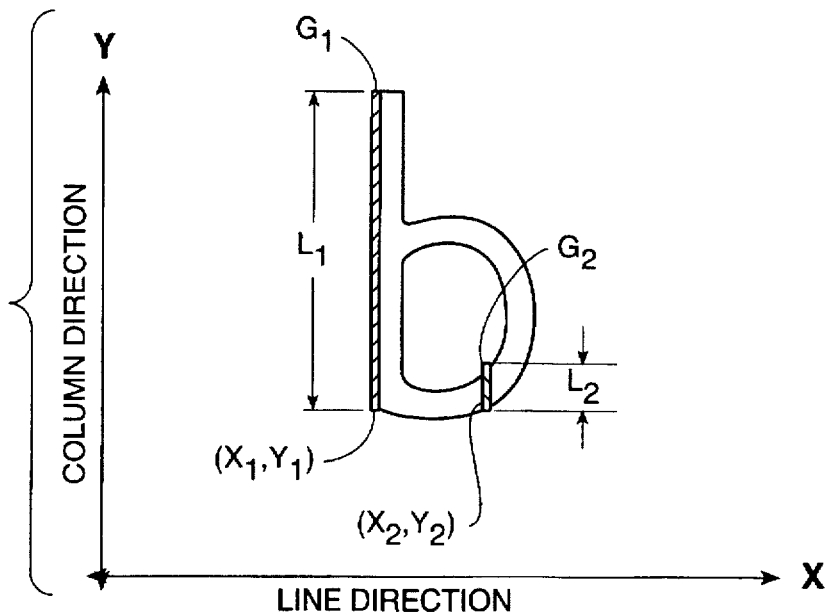
FIG._2
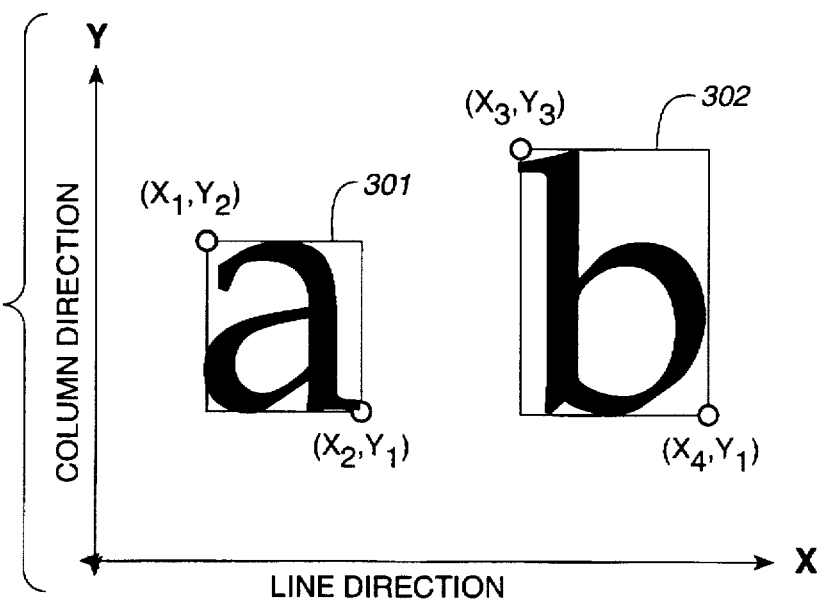
FIG._3
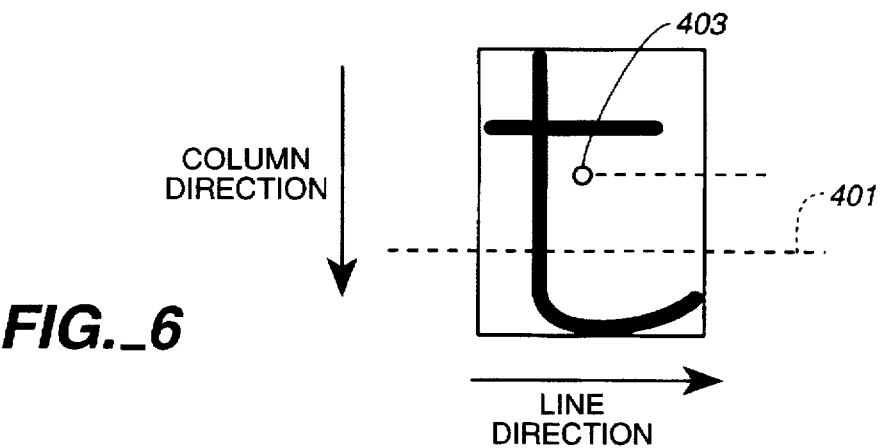
FIG._6 widespread corruption that accomp
FIG._4A
widespread corruption that accomp
FIG._4B
widespread corruption that accomp
FIG._4C
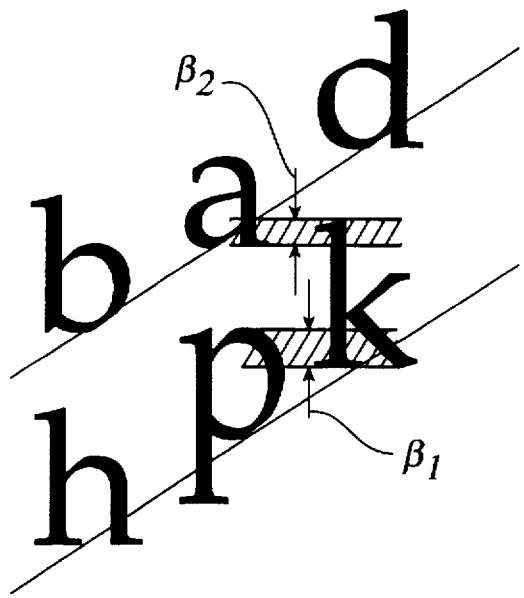
FIG._7
FIG._9

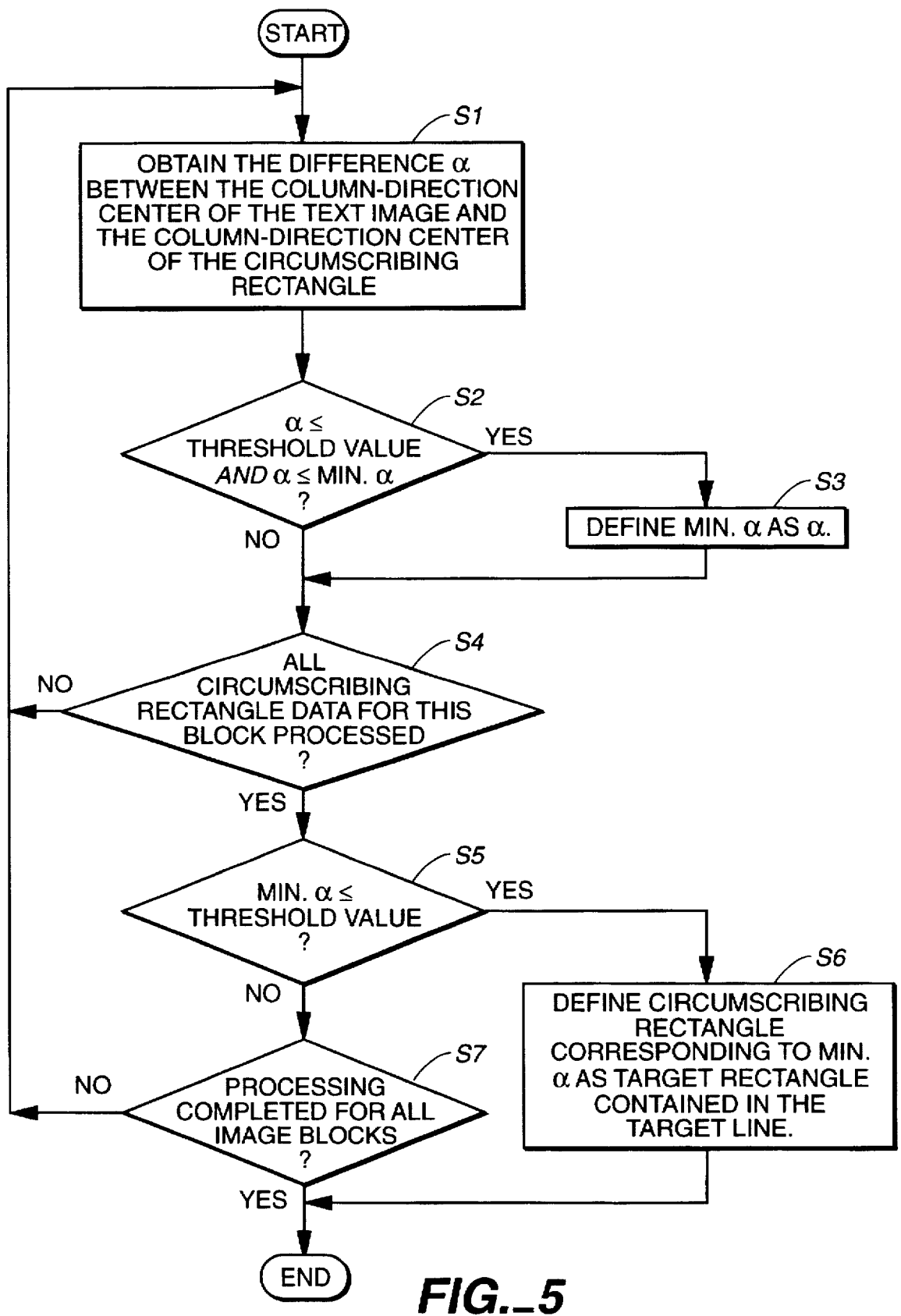
FIG._5

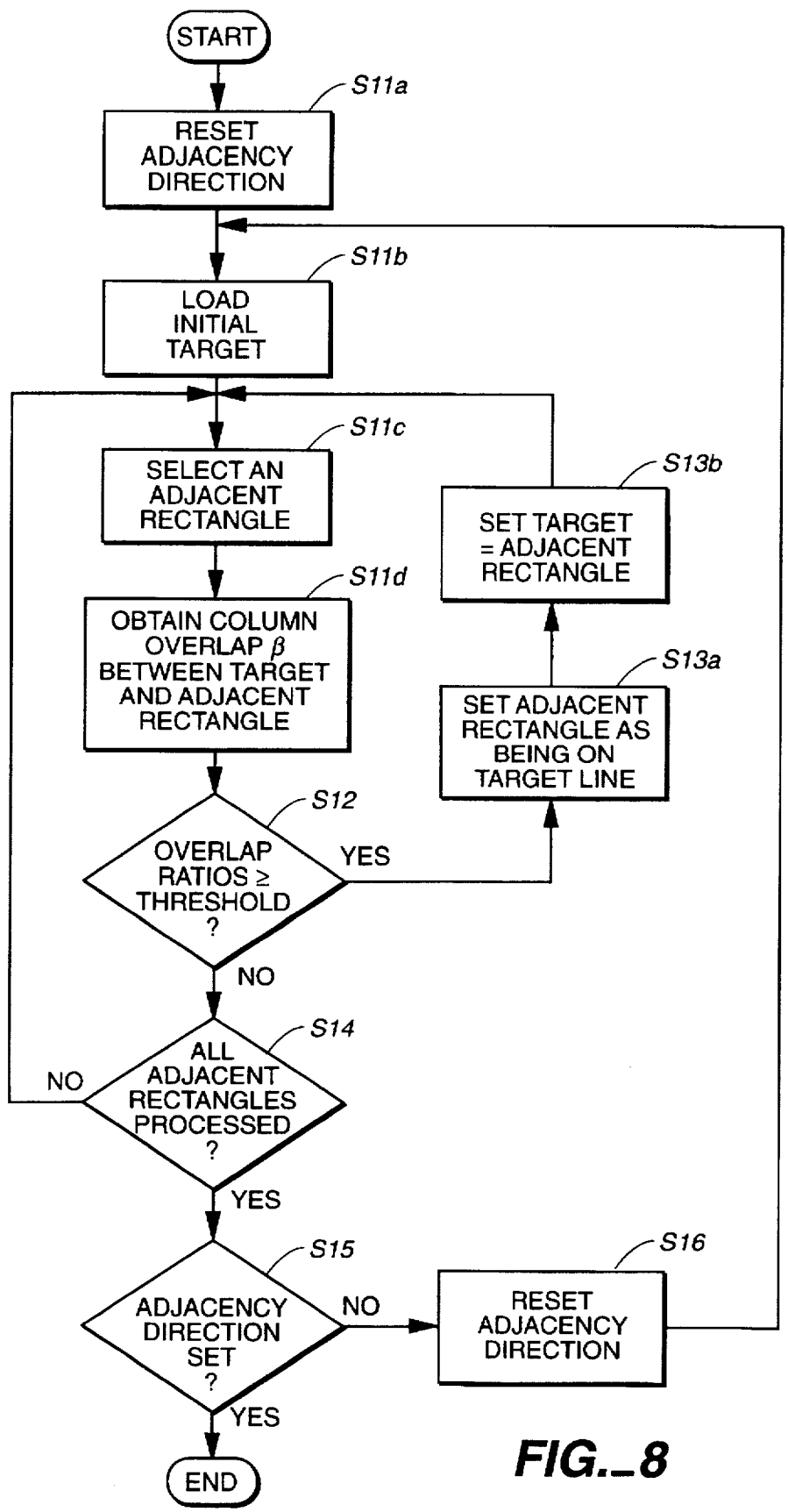
FIG._8

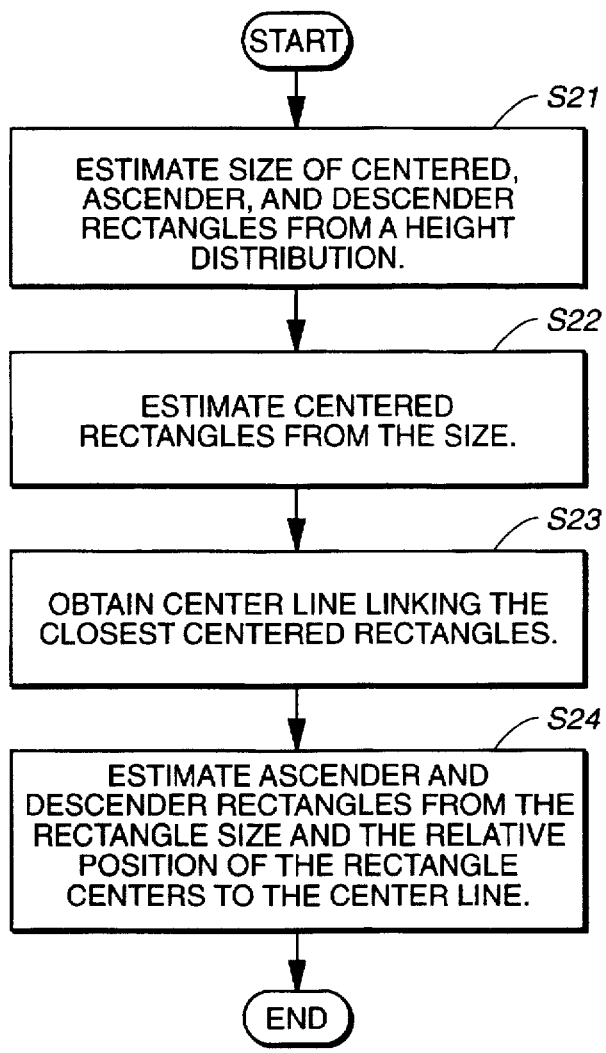
FIG._10
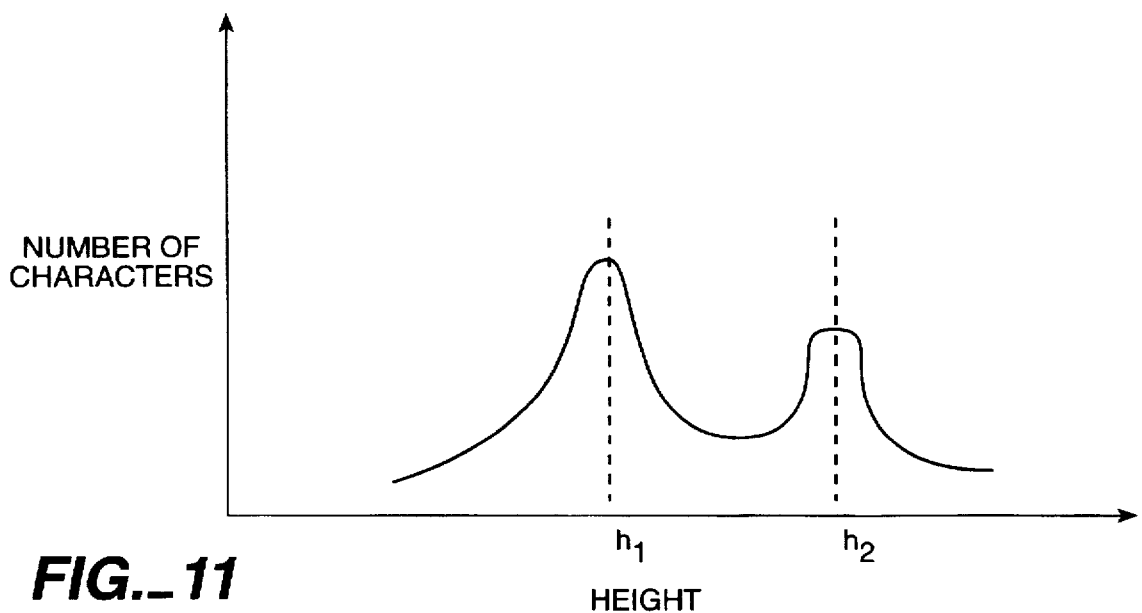
FIG._11

FIG._12
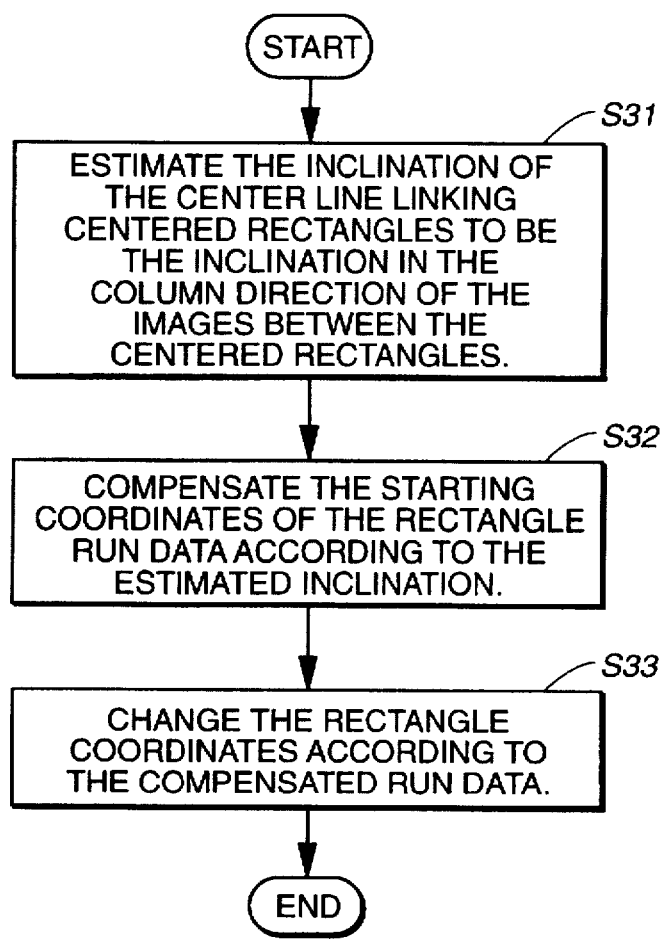
FIG._13
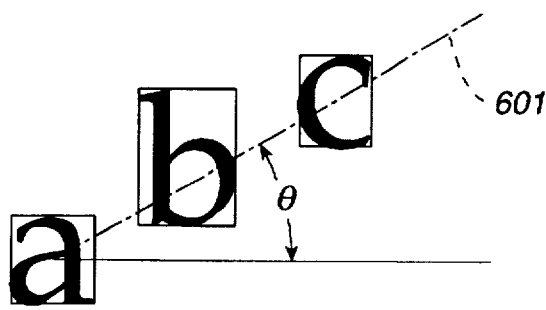
FIG._14

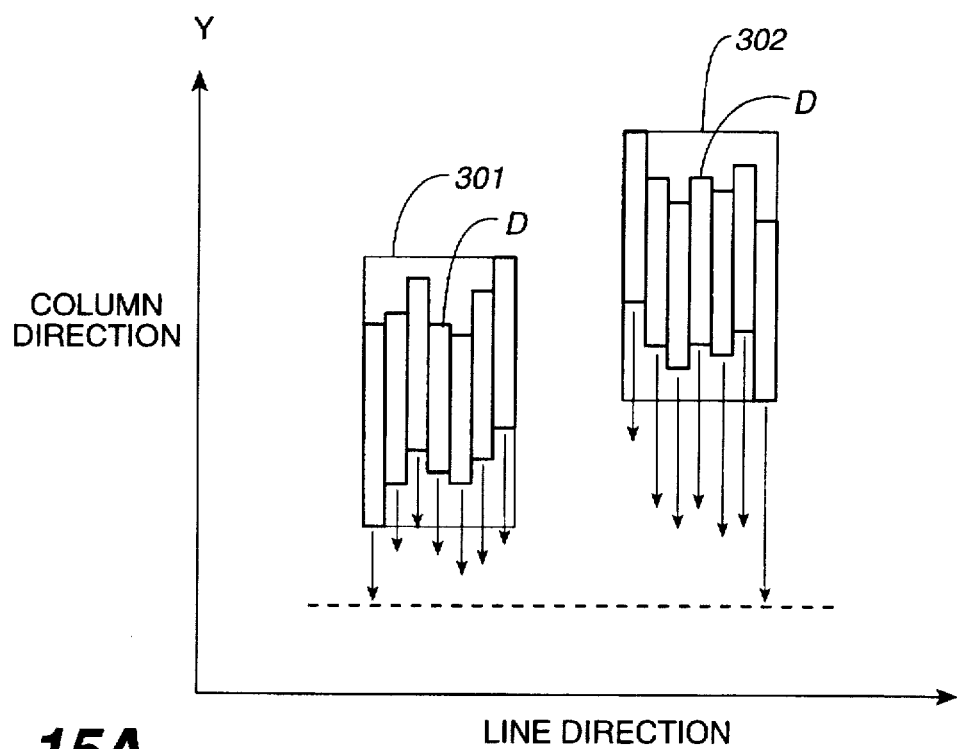
FIG._15A
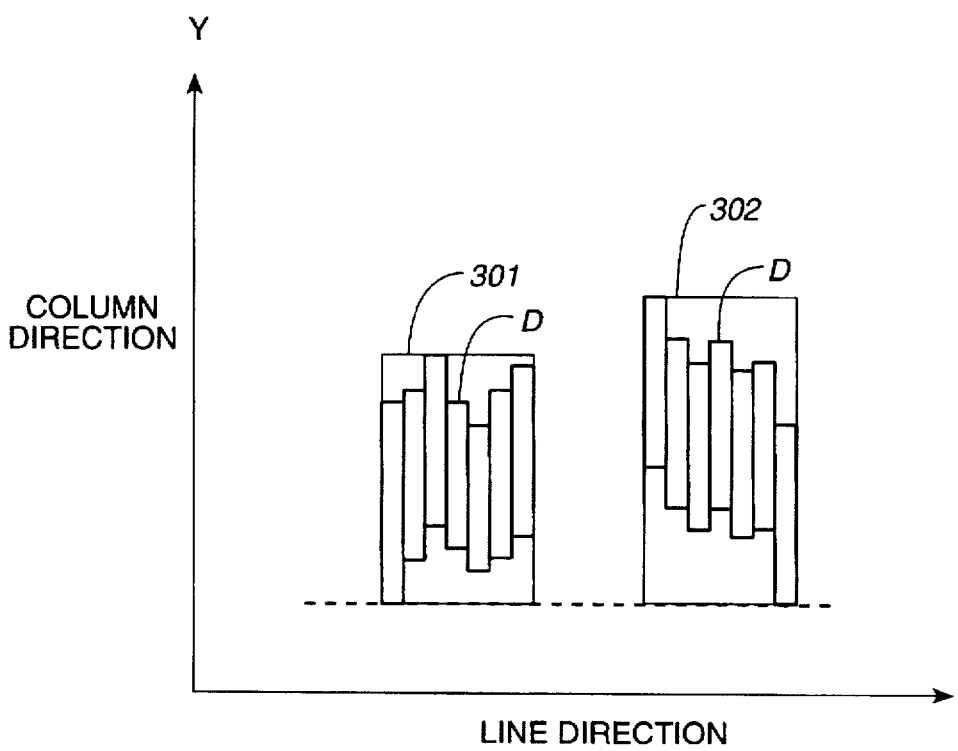
FIG._15B

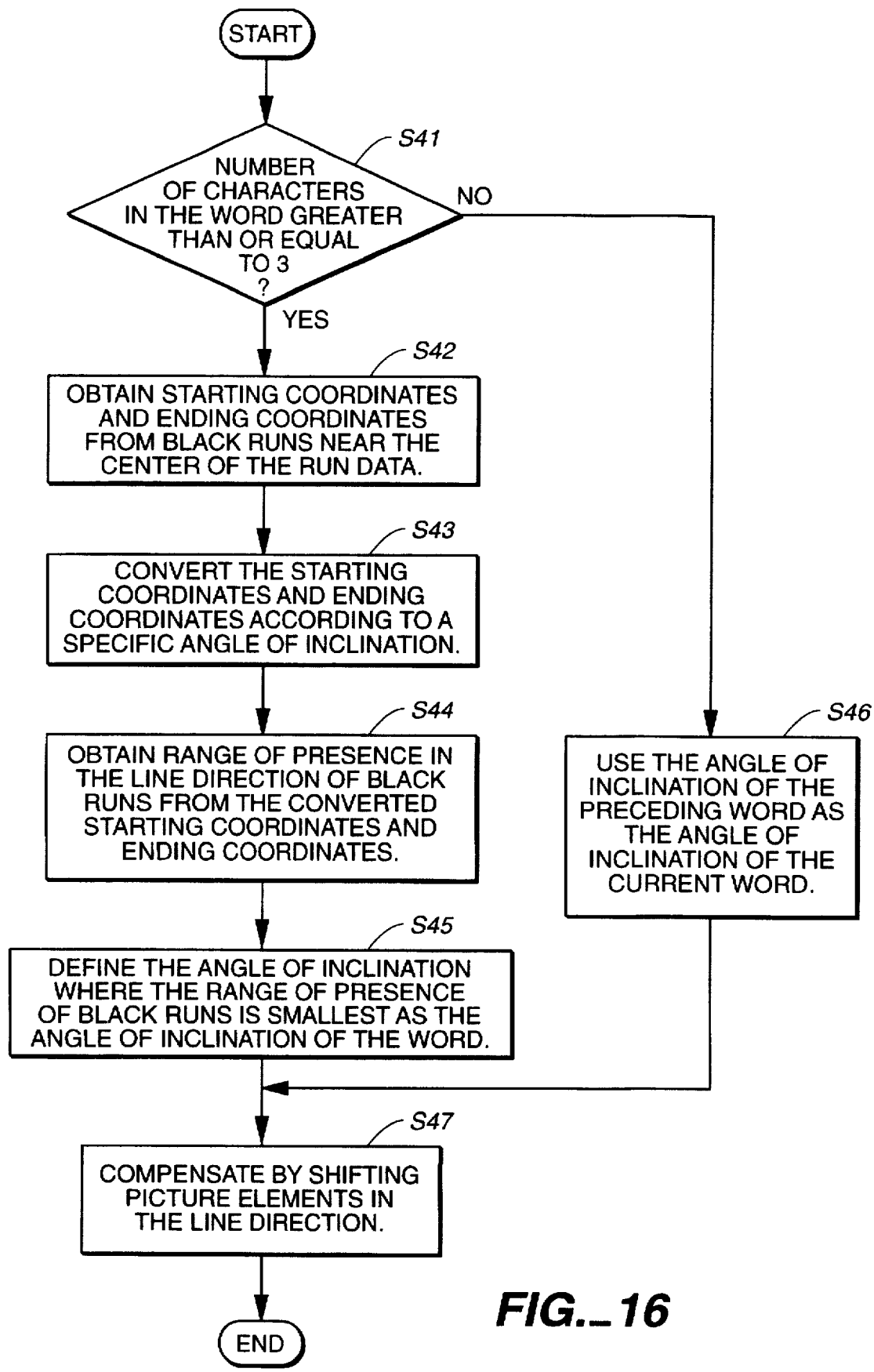
FIG._16

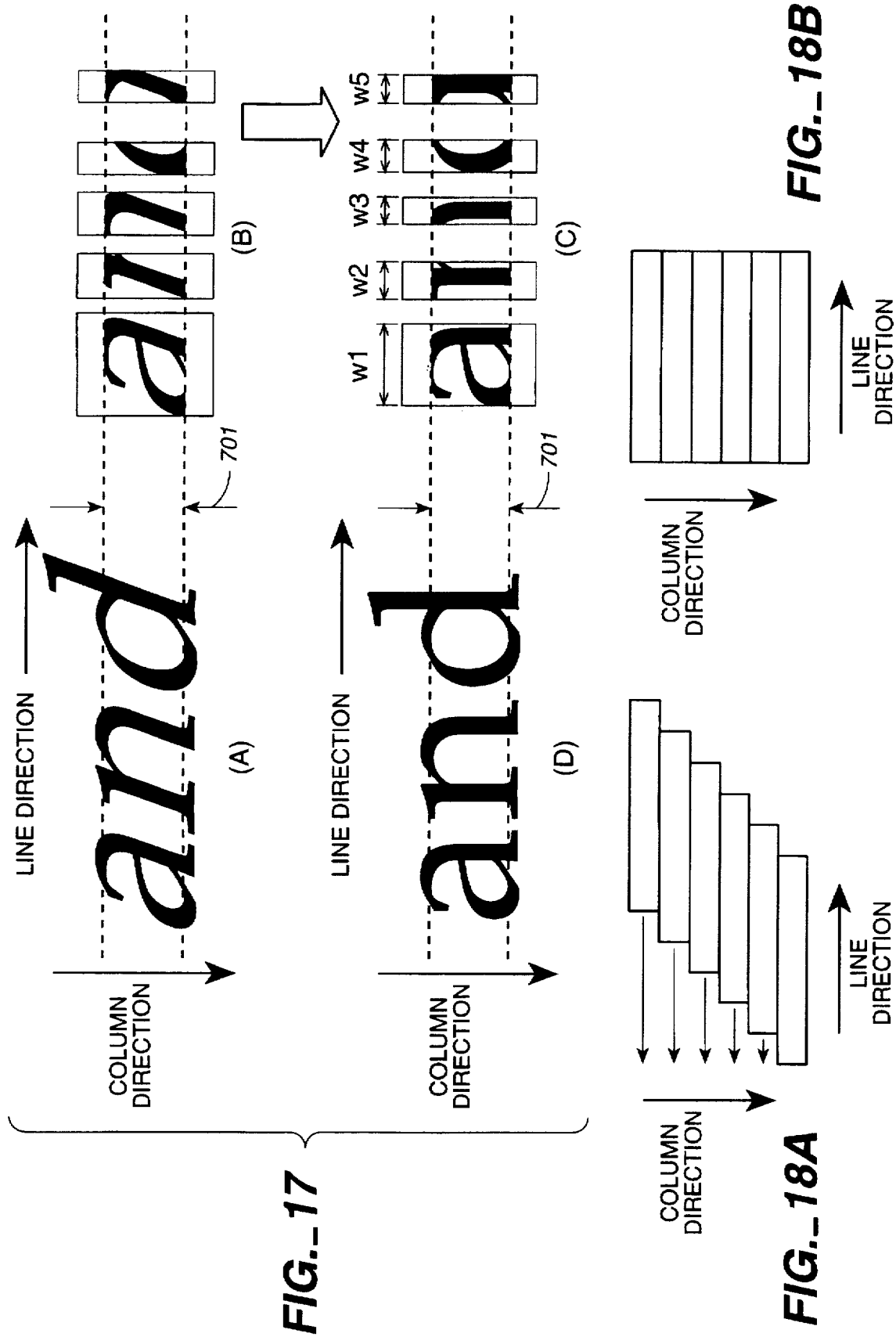

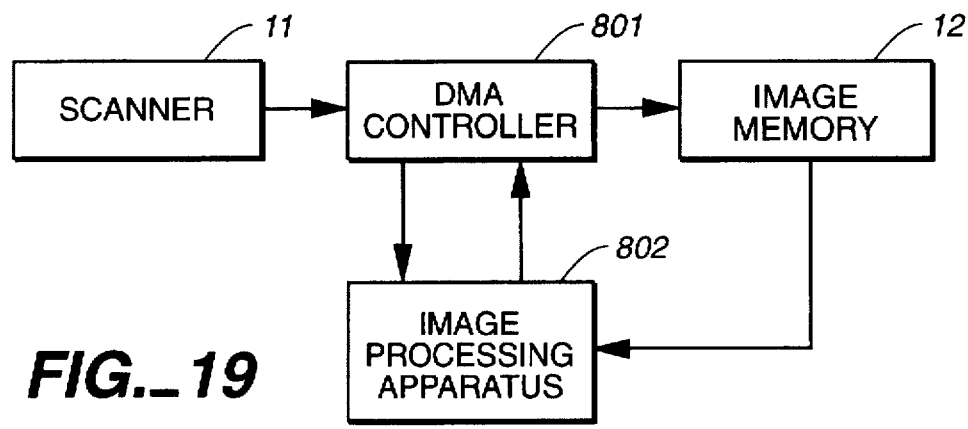
FIG._19
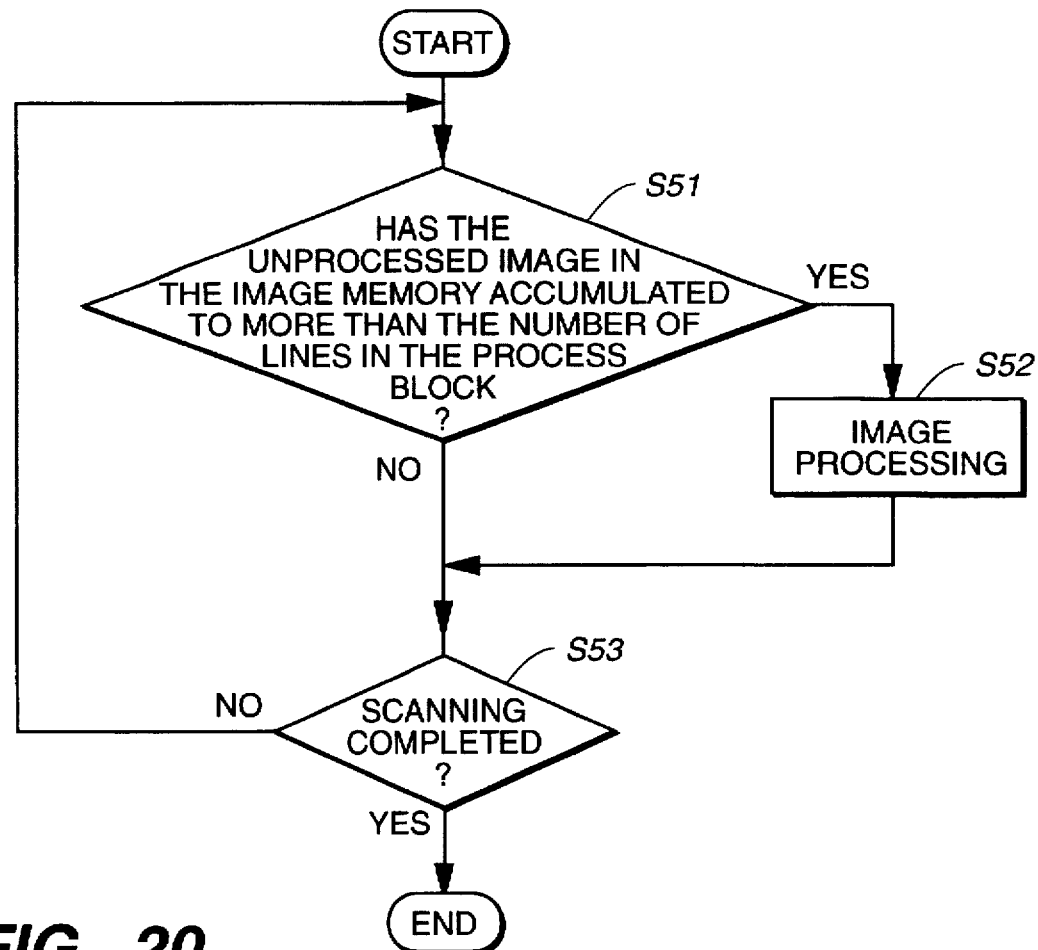
FIG._20

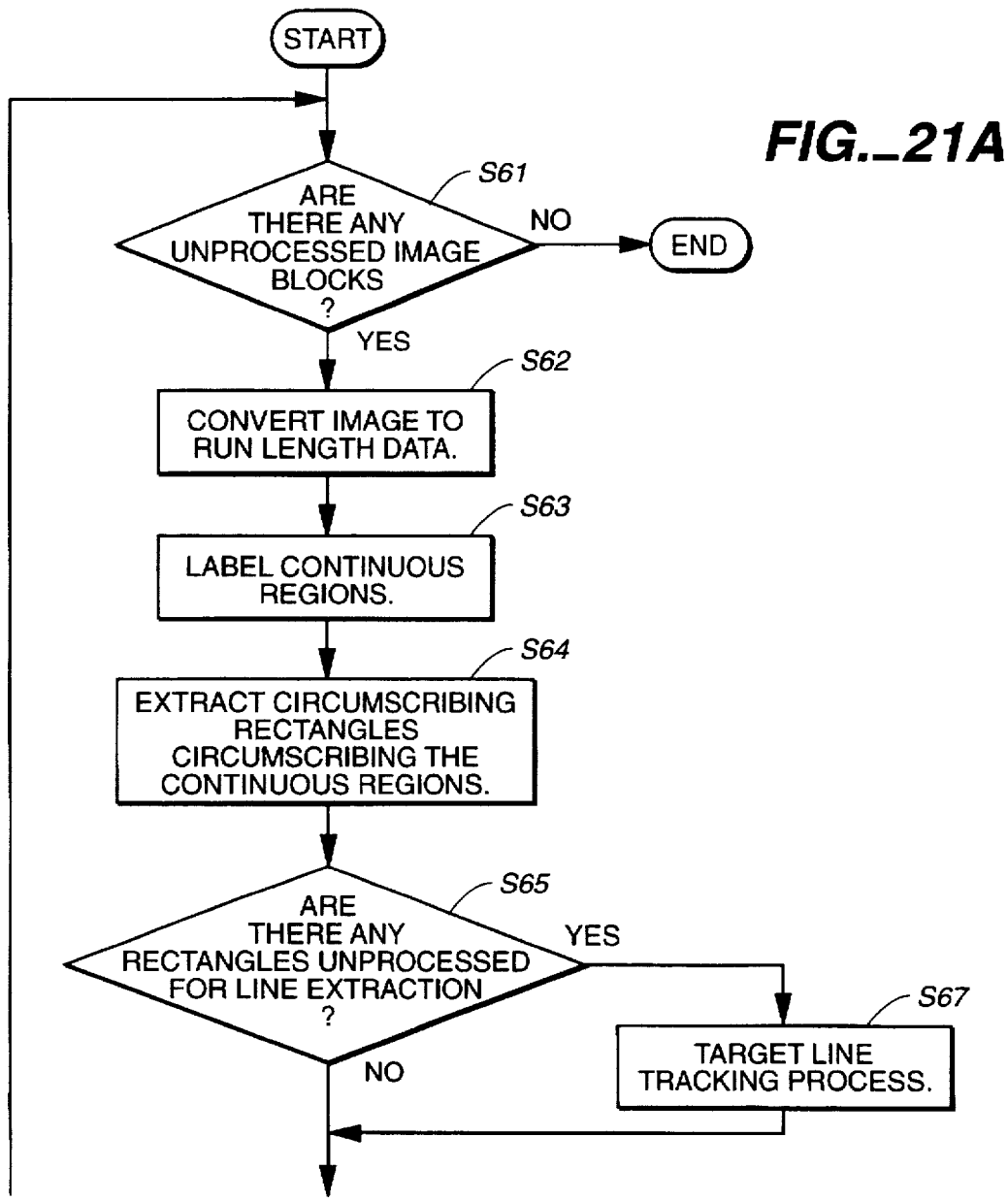
FIG._21
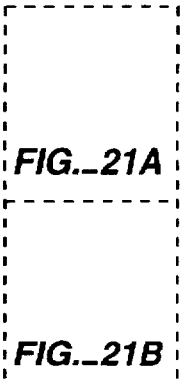
FIG._21A

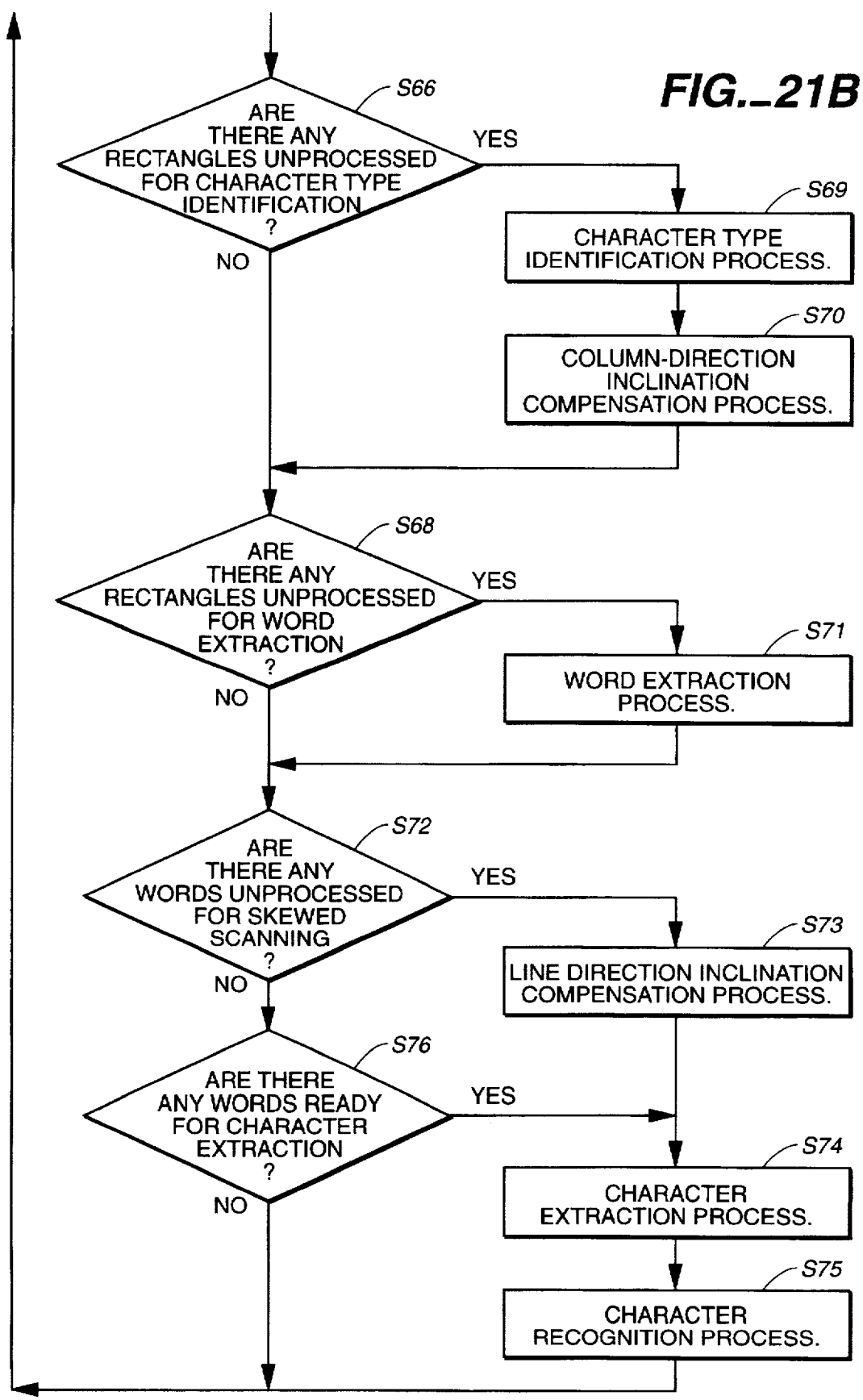

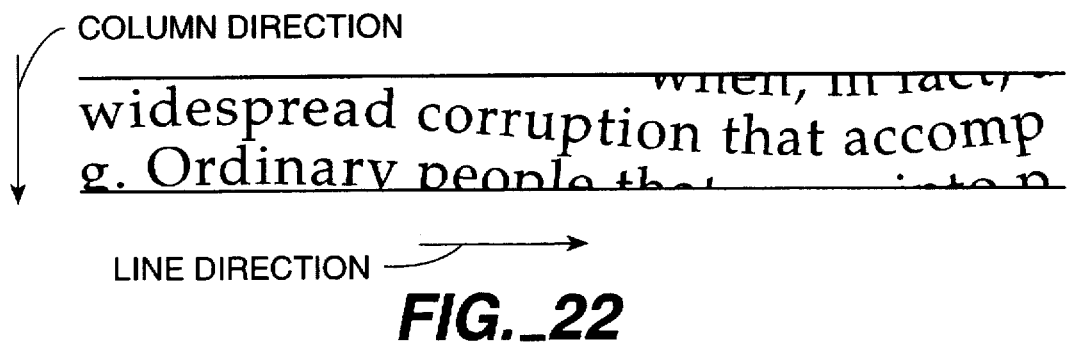
FIG._22
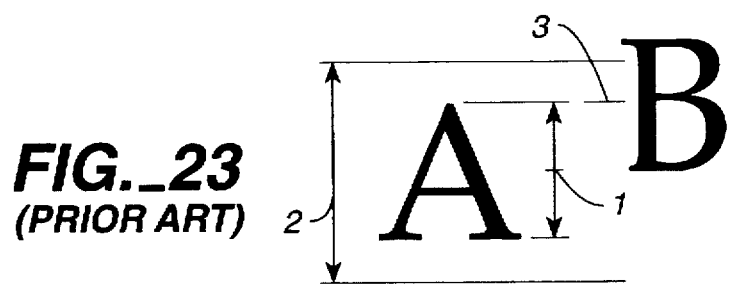
FIG._23
(PRIOR ART)
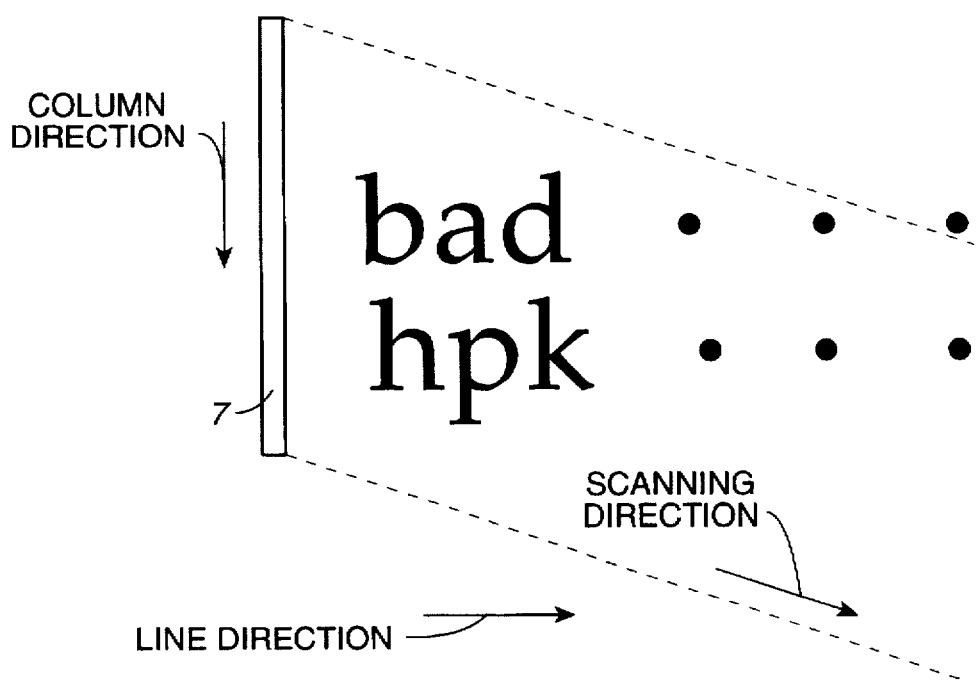
FIG._24

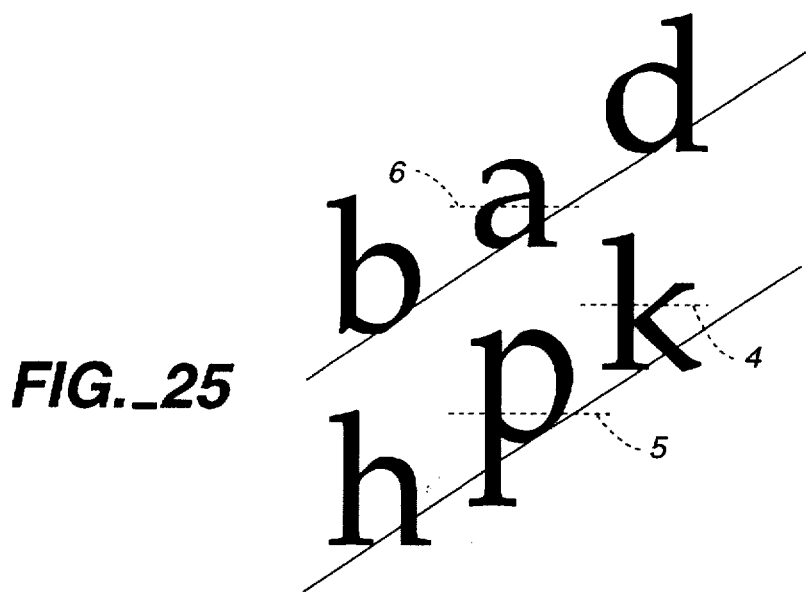
FIG._25
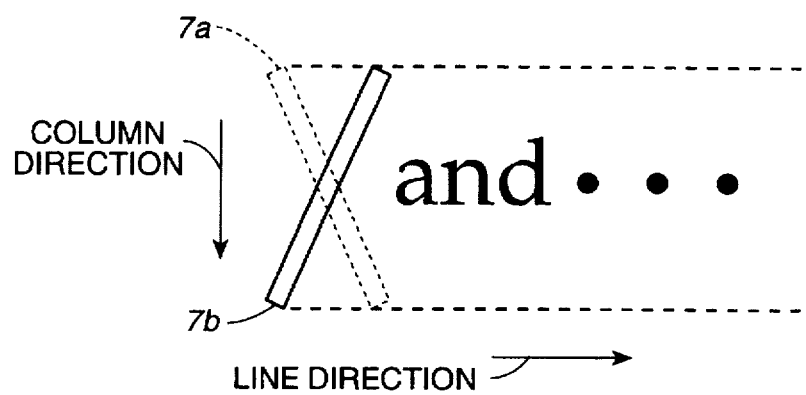
FIG._26
and widespread corruption that accompany
FIG._27A
*and widespread corruption that accompany*
FIG._27B

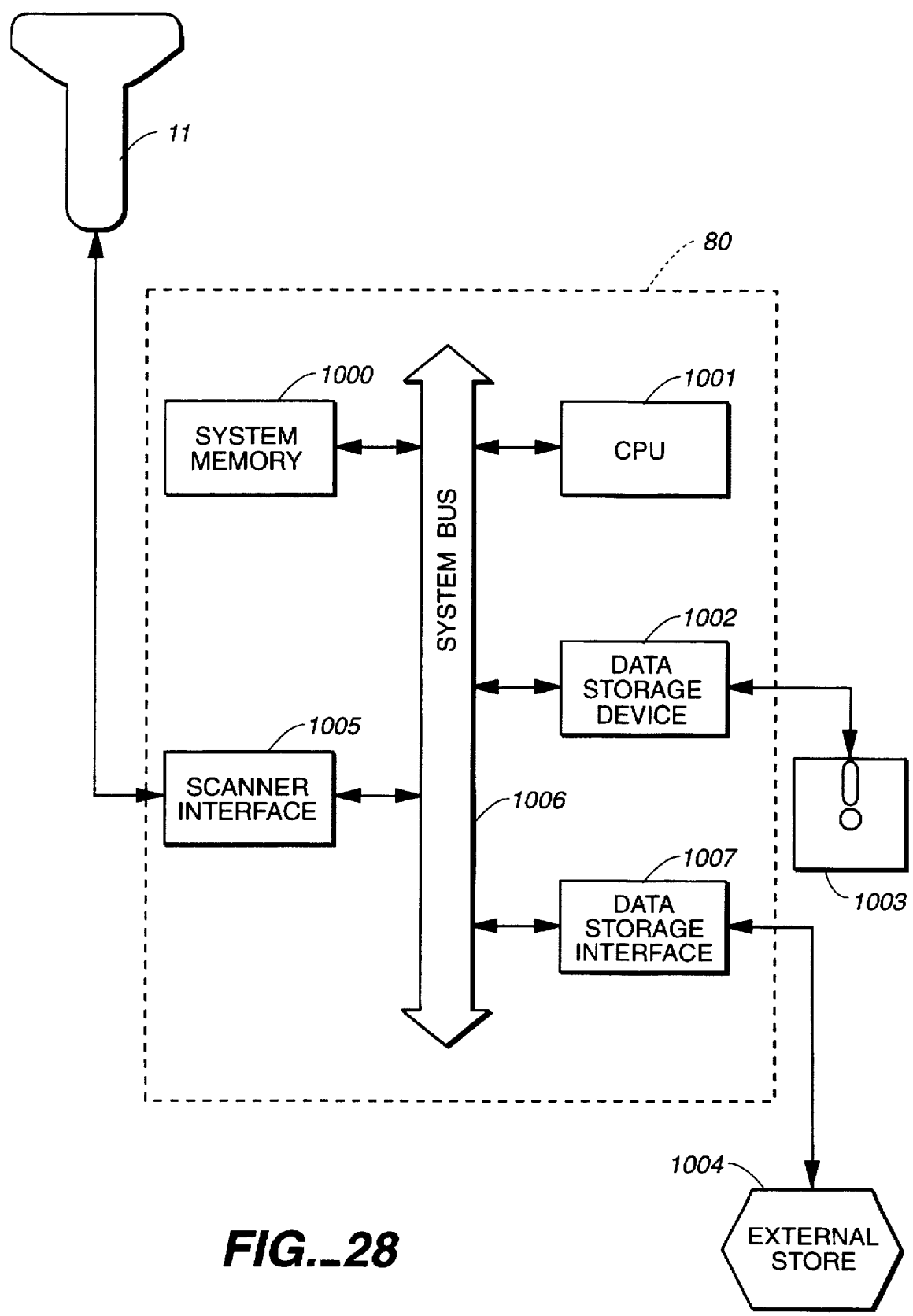
FIG._28

IMAGE PROCESSING METHOD AND APPARATUS

BACKGROUND OF THE INVENTION

1. Field of the Invention

The present invention relates to an image processing method, apparatus and computer program product which compensate for meandering lines and character inclination in a scanned text image to enable and enhance character recognition thereof.

2. Description of the Related Art

Handheld scanners which manually scan images written on a hard-copy document are widely available today. A handheld scanner commonly found in the marketplace is of the rolling type, in which the user physically presses the scanning wand against the document and rolls the wand across the desired image area. A roller member is provided on the scanning wand adjacent the scanner window to physically contact the document when external pressure is applied and enable movement while maintaining contact. The images on the document are optically read as the scanner is moved, converted to image data, and uploaded to the host device to which the scanner is connected.

In order to obtain acceptable character recognition rates in rolling type handheld scanners, the roller member must be moved in a stable manner along the text and in continuous contact with the document original. The width of the roller member is sized to provide a certain linearity to the scanning direction, thereby enabling best-scenario scanning without meandering lines irrespective of the speed at which the scanner is moved (the "scanning speed"). However, it is normally difficult for most users to move the scanner such that the rollers consistently contact the document. This commonly results in scanning document portions while the roller members are separated from the image. When this happens, the scanner to document distance ("scanning distance") cannot be obtained, accurate image scanning is therefore not possible, and linearity may be lost. As a result, the scanned text lines may meander or be scanned at an angle.

Another drawback to this type of scanner is that the overall size of the scanner wand housing (particularly the scanning window end) is rather bulky in relation to net scanning area to accommodate the rolling member and an encoder unit. The encoder unit generates a pulse signal according to the distance traveled in relation to detected rolling member rotations as the scanning wand is moved across the document. Durability-related problems also arise with frequent use due to the use of rollers or other mechanical moving members which frictionally engage the paper documents, which wear and can break down.

Two-line sensor handheld scanners eliminate the need for a roller member have likewise been developed. These two-line sensor scanners comprises two sensors (a first and a second sensor), and compares the image scanned at any given position by the first sensor, which precedes the second sensor in the scanning direction and therefore scans a given point first, with the image scanned by the second sensor to detect the scanning speed from the time difference between scanning the two images. An exemplary two-line sensor scanner apparatus is disclosed in U.S. patent application Ser. No. 08/499,887 (Attorney's Docket No. P2254a) filed Jul. 8, 1995, naming T. Nitta and M. Aoki as inventors and assigned to Seiko Epson Corporation of Japan. As disclosed in that application, the two line sensor technique eliminates the need for the roller member, and thereby resolves various problems present in roller-type scanners. But, Applicants have discovered that, by removing the roller member, scanning linearity decreases with respect to the scanning direction, and so makes it easier for an operator to scan a path across the document that meanders or is diagonal to the text.

An example of text scanned with a meandering scanning path is shown in FIG. 22. When conventional character recognition processing is applied to a meandering scan image as shown in FIG. 22, it is first necessary to determine which line of text the user intended to read, then individually extract each character from that line, and then recognize the characters. However, at the outset, it is also necessary to determine if the character being read actually belongs to the current line being read when attempting to extract characters.

A method for determining whether a character belongs to the line being read has been proposed in, for example, Japanese patent kokai number H3-250387 (1991-250387). In essence, this method determines that two adjacent characters to be on the same text line if their respective character centers are within a predetermined range of each other. More specifically, referring to PRIOR ART FIG. 23, if the center 3 of the height of one character ("B" in this example) is within a predetermined range 2 of the center 1 of the height of the preceding character ("A" in this example), the two characters are determined to be on the same text line.

However, this technique can be inaccurate, especially when multiple font sizes and mixed italics are scanned in. Moreover, even if simple monofont text is read in, the center of the character height of each read in letter can vary, even within the set of lower case alphabetic characters—a, b, c, d, .... Of course, the center of the character height within a given line also differs between the uppercase and lowercase letters. Consequently, the characters are classified into "centered", "ascender", and "descender" groupings based on their height and center characteristics.

Centered letters include a, c, e, m, n, r, s, u, v, w, x, and z. Ascender letters have greater vertical height than centered letters, and are specifically taller than centered letters measured from the same base line. Ascenders include all uppercase letters as well as the lowercase letters b, d, f, h, k, l, i, and t. Descenders similarly have greater vertical height than centered letters but descend below the base line; descenders include the lowercase letters g, p, q, and y. There are also full-height letters, specifically the lowercase j.

Because the center point of each character differs according the centered, ascender, or descender classification, the recognition accuracy of the method disclosed in H3-250387 degrades significantly when the image is scanned at a slant. To illustrate, take an example in which the letters "b, a, d" are found on one line, the letters "h, p, k" are on the line immediately below, and the text is scanned with the scanner wand moving at a right descending slope relative to the base line of the text with the scanner wand held perpendicular to the base line of the characters as shown in FIG. 24. In this figure, the wand-document contact area 7 denotes the position of the effective scanning window at a particular time and illustrates the oblique position change over time as the operator moves the scanning wand.

Upon completion, this scanning operation will result in a stepped pattern of characters as shown in FIG. 25. Note that an enlarged subsection of the image scanned at a right descending slope is shown in this figure. In addition, the character pattern shown in FIG. 25 could also result from a meandering scan.

If the line assignment of individual characters is based on the relative positions of the center of the character height, the letter "k" will be erroneously assigned to the same line as the letter "a" when "k" is extracted in this example. This is because the center 4 of "k" is closer to the center 6 of the letter "a" on the preceding line than it is to the center 5 of the letter "p" on the same line.

It is also possible to scan the document with the scanner wand held skewed to the right relative to the column direction as shown by the wand-document contact area 7b shown in FIG. 26. The scanned text resulting in this case will be skewed to the left as shown in FIG. 27(A). It is similarly possible to scan the document with the scanning wand skewed to the left relative to the column direction as shown by the dashed wand-document contact area 7a in FIG. 26. The scanned text resulting in this case will be skewed to the right as shown in FIG. 27(B).

When a character recognition process is applied to text scanned in this manner, the recognition rate drops significantly. In the case of Roman text in particular, text sloping to the left as shown in FIG. 27(A) is not normally used, and the recognition rate thereof is particularly poor.

Another method for detecting and compensating images sloping as shown in FIGS. 27(A) and (B) has also been disclosed in Japanese patent kokai number S64-156887 (1989-156887). This technique: 1) generates a peripheral distribution of black picture elements with the character string viewed from plural angles of the input scanning direction ("line direction"); 2) detects the inclination of the character string from the height of the peaks of this peripheral distribution; and 3) applies compensation according to the detected inclination. While generally more accurate than the H3-250387 method, it requires a large data sample and extensive data manipulation to obtain the peripheral distribution. Moreover, it is unsuited to detecting and compensating the inclination of individual words. The input scanning angle may vary frequently during scanner operation and is dependent on operator movement, thus making it necessary to detect the inclination for plural blocks of a certain small size.

Therefore, the object of the present invention is to enable improving the character recognition rate by accurately determining the text lines to be read, accurately determining whether adjacent characters are on the same line to enable accurate character extraction during the character recognition process, and reliably compensating images scanned with a meandering or skewed scanner head path while reducing data overhead associated with known techniques.

SUMMARY OF THE INVENTION

To achieve the aforementioned and related objects, the scanned image processing and character extraction technique according to the present invention involves, preliminary step, involves an image input device such as a handheld document scanner scanning and converting these images as computer-readable image data. Next, a line extractor examines the collected image data in a columnwise manner and determines the center area of the scanned image, including determining the center line of the row height when the image data includes plural meandering lines Thereafter, a character extractor extracts the character images in this center area as the text line containing the extracted character images. Preferably, the extracted text corresponds to the character image(s) closest to the center line determined by the image processor.

Further, preferably, a circumscribing rectangle enclosing each character and defined by a starting coordinate and an ending coordinate diagonal to said starting coordinate may be extracted by a rectangle extractor for each character read by the document scanner. The evaluation of whether a character image is in the center may be based on the relative positions of the center of the circumscribing rectangle enclosing the character and the center line of the row height, wherein the center of the circumscribing rectangle is obtained from the coordinate data of the circumscribing rectangle.

Further, the presently preferred embodiment determines whether adjacent character images are in fact on the same text line based on the overlap in the column direction of said adjacent character images, and repeating this evaluation until the scanned line image is obtained. This could be accomplished through analysis of coordinate data of the circumscribing rectangle enclosing adjacent characters. The overlap results could then be used to construct a text line containing the proper extracted characters. In this case, the line extractor may further comprise: a target line extractor for extracting the character images from the center area and a target line tracking means for obtaining the overlap in the column direction between the extracted character images and the character images adjacent thereto, and extracting the text line to be read by thereafter sequentially obtaining the overlap between adjacent character images. Of course, a circumscribing rectangle extractor for extracting a circumscribing rectangle enclosing each scanned character can be employed prior to line extraction to assist in determining the character overlap.

Further, the presently preferred embodiment of the invention additionally includes having a step determining the offset between the column-direction positions, or possibly the image centers of two character images contained in the same text line to be the inclination in the column direction between character images read in by the document scanner, and compensating the character images in the stepped pattern based on this determined inclination via a stepped character pattern compensator. Also, a run length data converter may be employed in this embodiment to convert the text images read by the document scanner to run length data for each scanned character. The run length data for each character may include the starting coordinate and length of the continuous run in the column direction of the black picture elements forming this character.

The stepped character pattern compensator of the preferred embodiment may further include a character type evaluator for determining the letter type (e.g., "centered," "ascender," and "descender") when the scanned character images are alphabetic letters, and a stepped character pattern compensating means for compensating the alignment of the character images based on the offset between the column-direction positions of two character images of the same character type. Also, the image centers may correspond to the centers of the circumscribing rectangles enclosing the adjacent characters obtained from the coordinate data of their respective circumscribing rectangles. Finally, the character images read in a stepped pattern may be compensated according to the inclination in the column direction between the character images by changing the starting coordinates of the run length data.

The image processing technique according to the preferred embodiment of the present invention additionally modifies the slope of the scanned text images according to plural predefined angles with respect to individual character images inclined in the column direction via a skewed character compensator; identifies the angle in which the width of the text image in the line direction is smallest with respect to the column direction and uses this angle as the desired angle of the scanned text image; and compensating the inclination of the text image to this desired angle. Additionally, the desired angle may be utilized to modify the starting coordinates and ending coordinates of the run length data according to plural predefined angles, and obtaining the width of the text image in the line direction from the modified starting and ending coordinates. Compensation the text image inclination may be achieved by moving picture elements in the line direction when compensating the text image inclination to the angle whereat the text image width in the line direction is smallest.

Furthermore, detection and compensation of inclination to the column direction may be applied in the preferred embodiment on a word unit basis when the scanned text image is an alphanumeric text document. Inclination compensation of the current word may be based on the column-direction inclination of the previous word when the number of alphanumeric characters forming one word unit in the scanned alphanumeric text document is less than a predetermined number.

The image processing technique of the preferred embodiment can therefore extract the character images in the center area from text image data scanned with plural meandering lines, and determine as the text line to be read the text line containing the extracted character images. In addition, the evaluation of whether adjacent character images are on the same text line is determined from the overlap in the column direction of adjacent character images, and repeating this evaluation to extract a line image. It is therefore possible to reliably extract the lines being scanned by the user even when the document is scanned with plural meandering lines.

Furthermore, the offset between the column-direction positions of two character images contained in the same text line can be determined from the column-direction offset between their respective image, and this offset is determined to be the inclination in the column direction between those characters for character images read in a stepped pattern by the document scanner. The character images in the stepped pattern are then compensated by changing the starting coordinates of the run length data according to this offset. Faster image compensation can therefore be executed when compared with compensation processes executed on a per picture element basis because the character images are compensated by simply changing the starting coordinates of the run length data according to the offset in the column direction between the centers of two character images.

In addition, the inclined slope of text images scanned by a document scanner may be altered on a character by character basis according to plural predefined angles, and normalizing the inclination to the smallest encounter inclination angle The means for changing the slope of scanned text images according to plural predefined angles and obtaining the width of the text image in the line direction is characterized by changing the starting coordinates and ending coordinates of the run length data with respect to the plural predefined angles, and then obtaining the width of the text image in the line direction from the converted starting coordinates and ending coordinates. Since such values are easily obtained, accurate high speed inclination correction can thereby be achieved by simply modifying the coordinate data. By contrast, conventional techniques employ slow, time dependent rotational transformations because text image inclination is compensated by analyzing and moving picture elements in the horizontal/row/line direction.

In addition, the techniques according to the presently preferred embodiment can uniquely operate on subsets of image data such as on a word basis, which can improve data streaming constancy and improve overall throughput over prior systems. Moreover, breaking up the image stream into blocks may improve overall system modularity and promote pipelining of image processing and character extraction stages.

BRIEF DESCRIPTION OF THE DRAWINGS

A better understanding of the present invention may be had in reference to following preferred embodiment when considered in conjunction with the following drawings, in which:

FIG. 1 is an overall block diagram used to describe the image processing means and method according to the preferred embodiment of the present invention;

FIG. 2 is a graph used to describe run length data according to the preferred embodiment;

FIG. 3 is a graph used to describe the circumscribing rectangle data according to the preferred embodiment;

FIGS. 4A–4C illustrate conversion of text images scanned in a meandering manner according to the preferred embodiment;

FIG. 5 is a flow chart depicting evaluation of the center images during line extraction according to the preferred embodiment;

FIG. 6 is a graph used to further describe center image evaluation as described in FIG. 5;

FIG. 7 is a stylized text sample depicting overlap characteristics between sample adjacent characters during line extraction;

FIG. 8 is a flow chart illustrating line extraction according to the preferred embodiment;

FIG. 9 is an illustration describing how characters of extremely different sizes are handled according to the preferred embodiment;

FIG. 10 is a flow chart depicting character type evaluation according to the preferred embodiment;

FIG. 11 is a graph of the column direction character height distribution used to evaluate the character type as shown in FIG. 10;

FIG. 12 is a stylized text sample used to assist in describing character type evaluation according to the preferred embodiment;

FIG. 13 is a flow chart describing stepped pattern character compensation according to the preferred embodiment;

FIG. 14 is a stylized text sample used to describe the inclination of stepped pattern characters according to the preferred embodiment;

FIGS. 15A and 15B correspond to graphs used to describe compensating stepped pattern characters according to the preferred embodiment;

FIG. 16 is a flow chart describing skewed character compensation according to the preferred embodiment;

FIG. 17 is a stylized text sample used to describe skewed character compensation depicted in FIG. 16;

FIGS. 18A and 18B graphically describe the line direction shifting of picture elements occurring during skewed character compensation according to the preferred embodiment;

FIG. 19 is a block diagram used to describe scanned image data block segmentation according to the preferred embodiment;

FIG. 20 is a flow chart depicting image data collection in accordance with the block diagram of FIG. 19;

FIGS. 21A and 21B show a flow chart for describing the fully integrated image processing method according to the preferred embodiment;

FIG. 22 is an example of a meandering scan event;

PRIOR ART FIG. 23 is a stylized text sample used to describe line extraction through conventional methods;

FIG. 24 is a stylized text sample used to describe the movement of the scanner wand when moved at a right declining slope relative to the base line of the text;

FIG. 25 is a stylized text sample used to help describe processing of textual images scanned with the scanner wand moving at a right declining slope relative to the base line of the text;

FIG. 26 is used to help describe the movement of the scanner wand when held skewed to the column direction of the text being scanned; and FIGS. 27A and 27B are examples of the text obtained by scanning with the scanner wand held skewed in relation to the column direction of the text being scanned.

FIG. 28 is a block diagram of a representative processing system capable of implementing the preferred embodiment.

DESCRIPTION OF THE PREFERRED EMBODIMENT

Turning now to the drawings, FIG. 1 is a block diagram of the overall constitution of an image processing apparatus according to the preferred embodiment of the invention. As shown in FIG. 1, the macro blocks of this image processing apparatus comprise image scanner 10, run length data converter 20, circumscribing rectangle extractor 30, line extractor 40, stepped character pattern compensator 50, word extractor 60, and character extractor 70. These are individually described below.

Components of this invention may be conveniently implemented using a conventional general purpose digital computer programmed according to the teachings of this specification, as will be apparent to those skilled in the computer arts. Appropriate software coding can be readily prepared based on the teachings of the present disclosure, as will be apparent to those skilled in the software art. The present invention may also be implemented by the preparation of application specific integrated circuits or by interconnecting an appropriate network of conventional component devices and circuits, as will be readily apparent to those skilled in the art.

In the preferred embodiment of the present invention, run length data convertor 20, circumscribing rectangle extractor 30, line extractor 40, stepped character pattern compensator 50, word extractor 60, and character extractor 70 take the form of interdependent threads executing on a general purpose processing system 80 (FIG. 1). These threads permit the processing system 80 to carry out the image development techniques and processes of the preferred embodiment when the processing system 80 reads and executes their corresponding programming instructions from a computer readable storage medium. The storage medium containing the thread instructions can include, but is not limited to, any type of disk media including floppy disks, optical disks, CD-ROMs, magneto-optical disks, hard drives or disk arrays whether located within or external to the processing system 80. Alternatively, the storage medium can include ROM, RAM, EPROM, EEPROM, Flash EEPROM or any other type of media suitable for storing computer readable instructions.

FIG. 28 illustrates in more detail a representative processing system 80, which includes system memory 1000, CPU 1001 and scanner interface 1005 interconnected via a system bus 1006 well known in the computer arts. Also interconnected to the system bus 1006 is system-addressable storage device 1002 capable of accepting, reading and writing information to a type of removable media 1003 and external store 1004 as representative storage mediums in communication with representative processing system 80. Accordingly, in this representative processing system, programming instructions corresponding to run length data convertor 20, circumscribing rectangle extractor 30, line extractor 40, stepped character pattern compensator 50, word extractor 60, and character extractor 70 may be partially or fully contained within external store 1004, removable media 1003, or system memory 1000 as is well known in the art.

Removable media 1003 may include a floppy disk, CD-ROM, ROM cartridge or other apparatus suitable for holding information in computer readable form. Similarly, external store 1004 may include another processing system, a computer readable storage component, a collection or network of processing systems and/or storage components, or similar device or devices in communication with processing system 80 to exchange information including the above-mentioned thread instructions. Further, in this embodiment, processing system 80 is indicated as being a general purpose personal computer. However, an ordinary skill with knowledge of the presently preferred embodiment according to the present invention should know that the particular processing system could alternatively include, for example, a special-purpose dedicated microcontrolled subsystem or similar processing device as long as it has sufficient resources for at least sequential execution of the techniques described and charted hereinbelow and has sufficient interfacing resources to communicate and exchange information with the image scanner 11.

Image scanner 11 comprises, for example, an optical scanning device as scanner 10, and an image memory 12 for storing the scanned image data such as that described in U.S. patent application Serial No.08/499,537, (Attorney's Docket No. P2254a) filed Jul. 7, 1995 naming T. Nitta and M. Aoki as inventors and assigned to Seiko Epson, Inc. which is fully incorporated herein by reference.

Run length data converter 20 comprises a run length data conversion unit ("run data converter") 21, and run length data memory ("run data memory") 22, both described in further detail below. The run length data refers to the starting coordinate of the black runs forming each character (where the "black runs" are the continuous run in the column direction of the black picture elements), and the length of these black runs. More specifically, referring to FIG. 2 where the Y axis represents the column direction and the X axis represents the line direction, the black run of one element forming the letter "b" (shown as black run $G_1$ in FIG. 2) has starting coordinates of $(X_1, Y_1)$ and a length of $L_1$. The black run of another element in the same letter "b" (shown as black run $G_2$ in FIG. 2) has starting coordinates of $(X_2, Y_2)$ and a length of $L_2$. The run length data comprising the starting coordinates of all black runs forming a given character and the corresponding length of each obtained black run is thus calculated for each character. This conversion of images to run length data is executed by run data converter 21, and the run length data thereby obtained for each character is then stored to run data memory 22.

Circumscribing rectangle extractor 30 comprises labeling unit 31, circumscribing rectangle extracting unit 32, and circumscribing rectangle data memory 33. Note that the circumscribing rectangles as referenced herein are illustrated by the rectangles 301, 302 enclosing and circumscribing each character as shown in FIG. 3.

To obtain the circumscribing rectangles 301 and 302, labeling unit 31 preferably labels each black run forming a single character with the same identification number in order to identify those black runs having the same identification number as forming the same character. For example, all black runs forming the letter "a" may be labeled with identification number "1," and all black runs forming the letter "b" may be labeled with identification number "2."

Once each of the characters has been labeled by labeling unit 31, circumscribing rectangle extracting unit 32 obtains the circumscribing rectangles 301, 302 for each identification number. More specifically, rectangle extracting unit 32 calculates the diagonal coordinates of the circumscribing rectangles 301, 302. For example, the diagonal coordinates of circumscribing rectangle 301 for the letter "a", referring to FIG. 3, are $(X_1, Y_2)$ and $(X_2, Y_1)$, and the diagonal coordinates of circumscribing rectangle 302 for the letter "b" are $(X_3, Y_3)$ and $(X_4, Y_1)$ respectively. Then, the resulting coordinate data of the circumscribing rectangles 301, 302 is stored to circumscribing rectangle data memory 33.

Line extractor 40 comprises a target line extractor 41 and a target line tracking unit 42. With reference to FIG. 4A, target line extractor 41 extracts the character images 402 from a multi-line meandering scan that are either on or in close proximity to the center line 401 (shown as a dashed line) of the row height when the scanned text is examined in the column direction and determines the text line that the user is attempting to read (the "target line"). In the case shown in FIG. 4A, the character images 402 that are either on or in the proximity of center line 401 include the letters "p", "t", and "I" in the word "corruption", and target line extractor 41 determines the line containing these letters to be the text line that the user is attempting to read. Of the character images 402 that are either on or in the proximity of center line 401, e.g., the letters "p", "t", and "i" in this example, the character closest to center line 401, i.e. "t", is then selected and extracted.

Evaluation of the center image or the target rectangle during line extraction is described in detail with reference to the flow chart of FIG. 5. Note that, in this embodiment, the process is executed using the circumscribing rectangle data for each character. In FIG. 5, control begins at step S1. At step S1, the difference a between center line 401 (FIG. 4A) and the center in the column direction of the circumscribing rectangle of the character being processed is evaluated. Control then passes to step S2, in which a determination is made whether this difference α is less than or equal to a predetermined threshold value AND is also less than or equal to the minimum difference α (min. α) previously obtained and stored. If so, control transfers to step S3 wherein the difference α obtained in step S1 is stored as the new minimum difference α. Control then resumes at step S4.

If, however, in step S2, the difference α is not less than the predetermined threshold OR the previously stored minimum α, control instead passes to step S4.

At step S4, a determination is made as to whether steps S1–S3 have been completed for the circumscribing rectangles of all characters in the block currently being processed (it is further assumed herein that text image processing is applied in block units). If it has not been completed, the control loops back to step Si and steps S1–S3 are reiterated.

If, however, in step S4, it is determined that processing has been completed, control instead passes to step S5. At step S5, a determination is made whether the minimum difference a stored in the last executed step S3 is less than or equal to the threshold value. If, in step S5, the determination is made that the minimum difference α is less than or equal to the threshold value, control passes to step S6 in which the circumscribing rectangle corresponding to that minimum difference α is defined as the rectangle of the character closest to the center line, and that character is defined as the target character circumscribed by the "target rectangle". With reference to FIG. 6, this evaluation is more specifically accomplished by obtaining the difference α between center line 401 and the center 403 in the column direction of the circumscribing rectangle of the letter ("t" in this example). If this difference α is the smallest difference obtained, that character "t" is determined to be the character closest to the center. Once step S6 completes, processing for the current scanned image data blocks successfully terminates.

If, however, in step S5, it is determined that the stored minimum difference α is not less than the threshold value, control instead passes to step S7. At step S7, a determination is made whether processing has been completed for all image blocks. If processing has not been completed, control loops back to step S1.

If, however, in step S7, the determination is made that processing has been completed for the scanned image data blocks, the line extraction process instead successfully terminates.

Referring back to FIG. 1, target line tracking means 42 evaluates the overlap in the column direction between the extracted character image and the character images adjacent thereto based on the character extracted as being closest to the center line, and determines whether the adjacent characters are on the same text line. This process is described below with reference to the stylized text example shown in FIG. 7 and the flow chart of FIG. 8. Note, that FIG. 7 is substantially the same as FIG. 25, but whereas prior art techniques determine whether adjacent characters are on the same line based on the alignment of the center positions of adjacent characters, the method of the present invention bases this determination on the degree of overlap in the column direction between adjacent characters. More specifically, referring to FIG. 7, if the letter "k" is the target letter, the columnwise or vertical overlap β1 to the adjacent character "p" is compared with the columnwise or vertical overlap β2 to the letter "a" in a different line, and it is determined that β1 is greater than β2. The letters "k" and "p" are therefore determined to be on the same line. It is therefore possible to accurately determine whether adjacent characters are on the same line of text by evaluating the amount of overlap between the adjacent characters.

This overlap comparison process is described in connection with the flow chart of FIG. 8. Note, that in this embodiment, the adjacent character overlap and line extraction process is executed using the circumscribing rectangle data for each character. Referring to FIG. 8, control begins at step S11a wherein the initial adjacency direction boolean is reset so that evaluation of adjacent characters begins to the left of the target character. It should be noted here that within a scanned text line, a text character may have up to two adjacent black line characters (one to its immediate left and one to its immediate right). As will become evident hereinbelow, overlap determination according to the present embodiment expands outwardly from initial target character obtained in the center image evaluation process described in connection with FIGS. 4–6, so building the target text line is done in two stages. In this embodiment, those characters which precede the initial target character potentially making up the target line are evaluated first, and those characters following the initial target character are evaluated second. Control thereafter transfers to step S11b. At this step, the initial target character obtained in the above-described center image evaluation process is loaded as the current target, including rectangle extraction particulars. As noted above, this will be done twice in this embodiment to handle adjacent characters on the left and right sides of this initial target. Then, control passes to step S11c, wherein a previously nonselected rectangle adjacent to the current target rectangle is selected for evaluation. At this step, it should be noted that there may be up to four potential adjacent rectangles per adjacency direction (left or right) for the current target rectangle. According to this embodiment, each potential adjacent rectangle for a given adjacency direction will be evaluated until the "correct" adjacent rectangle, if any, is found via overlap determination and comparison to a threshold described further below.

At step S11d, the overlap β in the column direction between the current target rectangle and the current adjacent rectangle is obtained. Next, the ratio between this overlap β and the height of the current target rectangle, and the ratio between this overlap β and the height of the current adjacent rectangle to which the current target rectangle is being compared is then obtained. Control then passes to step S12, wherein both ratios are compared against a predetermined threshold value. In this embodiment, the threshold value is fixed for ease of illustration. However, one ordinarily skilled in the art should realize that the threshold value can be changed based on several characteristics of scanned text, including: character font size, styling (bold, italics, underlining, etc.), whether the text is justified and line-spacing, and this threshold value can be updated in a known manner as these different characteristics come into play.

Referring back to FIG. 8, if, in step S12, it is determined that both ratios are greater than or equal to the threshold value, control passes to step S13a signifying that the correct adjacent rectangle has been found. At step S13a, the current adjacent rectangle is identified as being on the target line and control passes to step S13b. At step S13b, the current adjacent rectangle is assigned as the new current target rectangle, and control loops back to step S11c.

If, however, in step S12, it is determined that either or both ratios are less than the threshold value, control instead passes to step S14. At step S14, a determination is made whether processing of all adjacent rectangles for the current target rectangle has been completed. If not, the procedure loops back to step S11c. If processing has been completed, control instead passes to step S15.

At step S15, it is now known that all potential adjacent rectangles have been exhausted for the current target without any being within the threshold range. Therefore, the present embodiment may safely assume that: 1) it has reached the left row-wise end of the scanned text image and can now proceed to evaluate scanned character images encountered to the right of the initial target character; or 2) it has reached the right row-wise end of the scanned text image and has completed line extraction processing. It determines the proper processing path by evaluating the status of the adjacency direction boolean. If, in step S15, it is determined that the adjacency direction boolean is current reset, only those characters contained in the target line to the left of the initial target character have been found, and control passes to step S16. At step S16, this adjacency direction boolean is set so that the target text line to the right of the initial target character can be extracted once control loops back to step S11b. Thereafter, control loops back to step S11b.

However, in step S15, it is determined that the adjacency direction boolean is set, indicating that the complete target line has been extracted, processing instead successfully terminates. It is therefore possible to accurately determine whether adjacent characters are on the same line of text by evaluating the amount of overlap between the adjacent characters. The extracted text line resulting from this process is as shown in FIG. 4 (b). The extracted text line is then processed by the compensation means described below, resulting in a text line as shown in FIG. 4 (c).

It should be further noted that when characters differing extremely in size as shown in FIG. 9 are contained in the scanned text image, it is still possible to separate these characters without determining them to be in the same line by executing the character stepping technique according to the present invention as detailed hereinabove. More specifically, prior art methods consider only the character centers and will determine such characters to be on the same line. The method of the present invention, however, can distinguish whether the small uppercase "A, B, C" are on the same line as the significantly larger uppercase "D, E, F" because the ratios between the height of the individual circumscribing rectangles and the overlap β are significantly different. Specifically, the overlap β is great compared with the height of the individual rectangles of the small uppercase "A, B, C", but is small compared with the height of the uppercase "D, E, F" rectangles. As a result, these characters can be determined to be on different lines.

Referring again to FIG. 1, the stepped character pattern compensator 50 is described below.

Stepped character pattern compensator 50 comprises a character type evaluator 51 and a stepped character pattern compensating means 52. As described in the description of the prior art above, the Roman alphabet consists of different types of letters known as centered, ascender, or descender letters. As also described above, centered letters include lowercase letters a, c, e, m, n, r, s, u, v, w, x, and z. Ascenders are letters with greater vertical height than centered letters, and are specifically taller than centered letters measured from the same base line; ascenders include all uppercase letters as well as the lowercase letters b, d, f, h, k, l, i, and t. Descenders similarly have greater vertical height than centered letters but descend below the base line; descenders include the lowercase letters g, p, q, and y. There are also full-height letters, specifically the lowercase j.

Character type evaluator 51 identifies these different character types by means of the process described below with reference to the flow chart in FIG. 10, and FIGS. 11 and 12.

Referring to FIG. 10, control within character evaluator 51 begins at step S21. At this step, the character evaluator obtains the column-direction height of the circumscribing rectangles for each character based on the rectangle data (coordinates) to generate a height distribution as shown in the exemplary graph of FIG. 11. In FIG. 11, the column-direction height of each character is plotted along the abscissa or x axis, and the number (number of characters) on the ordinate or y axis of ordinates. This distribution concentrates the number of characters around two height points h1 and h2.

In step S22, the character height distribution for the scanned text image compiled in step S21 is evaluated in order to estimate those rectangles circumscribing the centered characters. Referring again to exemplary FIG. 11, he characters concentrated around height h1 are determined to be centered characters (step S22 in FIG. 10), and those concentrated around height h2 are determined to be ascenders or descenders according to this embodiment. Control thereafter passes to step S23.

At step S23 of FIG. 10, the center line 501 joining the centers of the rectangles of adjacent or nearly-adjacent centered letters (e.g. linking the letters a, c, and m in exemplary FIG. 12) is then obtained. Then, control passes to step S24 wherein, based on the size of the rectangles and the relative positions to the rectangle centers to center line 501, the characters are identified as ascenders or descenders. For example, center 502 of the rectangle for "b" is above center line 501 as shown in exemplary FIG. 12, and the character in that rectangle is therefore determined to be an ascender. Similarly, center 503 of the rectangle for "g" is below center line 501, and the corresponding character is therefore determined to be a descender.

When character type identification is completed, the inclination of stepped pattern characters is detected and compensated by stepped character pattern compensating means 52 by means of the process described below with reference to the flow chart in FIG. 13, and FIG. 14.

It is to be noted that a stepped pattern of characters as shown in FIG. 25 results when the text is scanned with the scanner window contained in the scanning wand is moved at a right descending slope relative to the base line of the text with the scanner wand held perpendicular to the base line of the characters as shown in FIG. 24. This arrangement of characters will be generally referred to as a "stepped character pattern".

As illustrated in FIG. 13, control begins at step S31 wherein the inclination of the stepped character pattern image is estimated. This is accomplished by obtaining the angle of inclination θ of center line 601 joining the centers of the rectangles of the centered characters ("a" and "c" in this case) as shown in exemplary FIG. 14. This angle of inclination θ is treated as the angle of inclination to the column direction of the centered character images. Note that ascenders and descenders are ignored in this process, and the angle of inclination θ is obtained using only the centered characters. This angle of inclination is used as the inclination of the line.

Control thereafter passes to step S32, wherein based on the estimated inclination, the starting coordinates of all run length data inside each rectangle are compensated. In other words, all run length data of the character images contained on the target line starting coordinates are compensated so that the angle of inclination θ is zero degrees. As more specifically shown in FIGS. 15A and 15B, the starting coordinates (the Y coordinates in this example) of all run length data D forming the characters inside the circumscribing rectangles 301, 302 are converted by an offset distance determined according to the angle of inclination θ.

Control then passes to step S33, where, based on the compensated run length data calculated in step S32, the coordinates of each rectangle are updated to their respective compensated coordinates.

Referring again to exemplary FIG. 14, the base line of the letters "b" and "c" will be aligned with the base line of the letter "a" when the images are compensated in this manner. This conversion is possible because the run length data comprises, as described above, the starting coordinates data and the run length of each black run forming each character, and the corresponding characters can be compensated by simply changing the starting coordinates of all run length data within any given rectangle. In addition, the compensation method of the present invention can be executed at high speed because the images are simply shifted in the column direction and a rotational transformation (affine transformation) is not applied as in taught in the prior art.

In character recognition tests applying character recognition processing to characters extracted from text images compensated by the method of the prior art, the character recognition rate was 94.4%. When character recognition processing was applied to text images compensated by the method of the present invention, the character recognition rate rose to 97.0%, thus demonstrating the effectiveness of the present invention.

The above described techniques are especially useful when text images are scanned with the scanner wand moving at a right descending slope relative to the base line of the text if the scanner wand is held perpendicular to the base line of the characters. However, when text is scanned with the scanner window of the scanning wand held skewed to the right or left relative to the column direction as indicated by the document-scanner contact area 7a and 7b illustrated in FIG. 26, additional processing is required.

The image obtained by scanning a document with the scanner wand held skewed to the right relative to the column direction results in a scanned image in which the black runs in the column direction slope to the left, as shown in FIG. 27A. The image obtained by scanning a document with the scanner wand held skewed to the left (shown by the dashed document contact area 7a in FIG. 26) relative to the column direction results in an image in which the black runs in the column direction slope to the right as shown in FIG. 27B. The technique for correcting images obtained by scanning with the scanner wand held skewed to the left relative to the column direction is described below with reference to FIGS. 16 and 17. Note that images wherein the runs of black picture elements in the column direction are inclined as shown in FIG. 27 are referred to below as "skewed characters."

Referring again to FIG. 1, this technique is executed by primarily skewed character compensator 71 of character extractor 70, and word extractor 60. Note that word extractor 60 is used because this process is preferably executed on a word means basis.

Referring now to FIG. 16, control begins at step S41 wherein a determination is made whether the number of characters included in the word means to which the skewed character compensation process will be applied is three or more (step S41). If only two or less characters need to be skew compensation, control passes to Step S46 falls through to step S47. However, if it is determined that indeed three or more characters must be evaluated in the current word, control passes to step S42.

At step S42, the starting coordinates and ending coordinates of the black run near the center of each character are obtained from the run length data forming each of the characters. This process is described in detail with reference to exemplary FIG. 17. Shown in the top left portion of FIG. 17, indicated by an (A), is the word "and" with the image thereof skewed to the right as described above. The serifs of such serif character images are then removed (i.e., the image data for the serif elements is ignored). This is necessary to prevent the serif elements from affecting the determination of the skewed width (the range of pixel presence) in the line direction of each character. The serifs are effectively removed by extracting the black runs within a specific range of the center region in the column direction of each character (area 701 in FIG. 17). The result of this step is shown by the blocked black runs in the top right portion of the figure.

indicated by a (B). The starting and ending coordinates of each of these extracted black runs are then obtained.

Control then passes to step S43 in FIG. 16. At steps S43–S45, the extracted image but as yet uncompensated elements shown in the top right portion of FIG. 17 are then converted according to plural angle theory. For example, the inclination of each image element is adjusted in 3° increments to the left, and the width w of the range of pixel presence in the line direction is obtained after each adjustment. These widths w are compared, and the angle at which the width w is smallest is defined as the angle of inclination after image compensation. The width w of each image element at which the range of pixel presence is smallest is shown as w1, w2, w3, w4, and w5 in the bottom right portion of FIG. 17, indicated by (C).

More specifically, according to the preferred embodiment, the starting coordinates and ending coordinates of each black run forming each image shown in the top right portion of FIG. 17 are converted according to a specific angle of inclination in step S43, and control passes to step S44. At step S44, the image element widths (the range of pixel presence) w1, w2, w3 . . . in the line direction are then obtained from these starting and ending coordinates. Thereafter, in step S45, the widths (the range of pixel presence) w1, w2, w3 . . . are then summed, and the angle at which the smallest sum is obtained is defined as the angle of inclination after image compensation. The compensated result of this process is shown in the bottom left portion of FIG. 17, indicated by (D).

Control thereafter passes to step S47, in which the picture elements are actually compensated. Processing thereafter successfully terminates.

By detecting and compensating the skewed characters on a word basis, character inclination detection and compensation are possible by means of the present invention even when the user changes the scanner input angle during a single scanning operation. In addition, the angle of inclination conversion used in step S47 for image compensation simply shifts the picture elements horizontally (in the line direction) as shown by the arrow dashes in FIGS. 18A and 18B rather than applying a rotational transformation (affine transformation) as is taught by the prior art. When the text image is skewed as shown in FIG. 17, this method of compensating by horizontally shifting the picture elements enables more accurate compensation and faster processing than do rotational transformation techniques. High speed processing is also facilitated when obtaining the width w in the line direction according to plural angles because only the starting coordinates and ending coordinates of the run length data are converted.

Referring still to FIG. 16, when it is determined in step S41 that the number of characters in the processed word is less than three (e.g., when the word is "a" or "an"), control instead passes to step S46 wherein the inclination of the preceding word is used as the inclination of that word. This is because the angle of inclination cannot be accurately obtained when there are only one or two letters in the word, and the compensation process therefore references the angle of inclination of the preceding word for greater reliability.

It should be obvious that, based on the above-described skewed character compensation technique for right-skewed characters can be routinely adapted by an ordinary skill in the art to permit compensation of left-skewed characters of the type shown in FIG. 27A.

In character recognition tests to determine the character recognition ratio when character recognition processing is applied to characters extracted from text images before and after compensating for character inclination relative to the column direction, the character recognition ratio was 91.9% before the skewed character compensation process of the present embodiment was applied to right-inclining characters, and rose to 97.6% after the above skewed character compensation. In similar tests applied to left-skewed characters, the character recognition ratio was 75.7% before compensation and rose to 95.9% after compensation. Note that the difference between the recognition ratio of right- and left-skewed characters is because fonts inclining to the left are rarely if ever used in Roman text subjected to character recognition processing.

By combining the detection and compensation process for both skewed and unskewed scanned text images, it is possible to detect and compensate so-called rotated images (where characters in a stepped pattern are additionally skewed to the right or left relative to the column direction), and it is therefore possible to also compensate images scanned in a meandering pattern as described above.

In character recognition tests to determine the character recognition ratio when these compensation processes are combined to compensate the character images before character extraction and character recognition processing, observed character recognition ratios approached 98.6%.

It should be noted that the processes described above are preferably executed by dividing the scanned images into plural blocks and applying the processes by block means. The block data is stored to an image memory, thereby enabling the image data in memory to be processed while the next image data is being scanned. As a result, all but the last image data blocks can be processed by the time scanning is completed.

FIG. 19 is a block diagram used to describe scanned image block segmentation according to the preferred embodiment. One block of image data read by scanner 11 is stored to image memory 12 by DMA (direct memory access) controller 801. Then, while the image data of the next block is being scanned, image processing apparatus 802 executes the processes described above based on the image data stored to image memory 12. A flow chart of the process used to accomplish this is shown in FIG. 20.

In FIG. 20, control begins at step S51. At step S51, a determination is made whether one block means of a predetermined size (preferably optimally-sized according to the specific memory capabilities of image scanner 10 or processing system 80) of unprocessed image data is stored to image memory 12. If so, control passes to step S52 and image processing according to the preferred embodiment is executed, and thereafter, control passes to step S53. If, however, in step S51 it is determined that at least one complete block means of scanned text image data is not yet available, control falls instead falls through to step S53.

At step S53, a determination is made whether scanning operations are complete. If scanning is not completed, control loops back to step S51 and image memory 12 is again polled for the presence of more image data. Otherwise, scanning is deemed complete and block-by-block image data collection according to the preferred embodiment successfully terminates.

Parallel processing of the image scanning operation and the image compensation process can therefore be achieved by means of this process, the individual image processing routines can be completed when the overall scanning operation is completed, and high speed, efficient processing can be achieved.

An overall flow chart combining the individual processes described above according to the preferred embodiment is described hereinbelow with reference to FIGS. 21A and 21B. As discussed previously, these individual processes are preferably collectively executed by processing system 80 shown in FIG. 1.

Scanned text image data processing according to the preferred embodiment begins at step S61. At step S61, a determination is made whether there are any unprocessed image blocks. This corresponds to the above-described technique for determining whether there are any unprocessed image blocks when the scanned image is divided into plural blocks for processing, as illustrated in FIG. 20. If there are unprocessed image blocks, the process described below is applied to those blocks.

If unprocessed image data is not yet available, processing successfully terminates according to FIG. 21A. However, processing system 80 according to the preferred embodiment will reschedule execution of step S61 and will continue to periodically poll image 12 (FIG. 19) until a complete block of scanned text image data is available for processing.

If at least one complete block of unprocessed image data read in by image scanner 11 is contained in image memory 12, control within the preferred embodiment instead passes to step S62. At step S62, the scanned image data is then converted to run length data (the starting coordinates and length of the black runs forming each character) as described hereinabove. Next, at step S63, the run length data forming each character is then labeled to identify that run length data as being a continuous region (the same unique identification number is assigned to the run length data forming each character); and the starting coordinates and ending coordinates of the circumscribing rectangles are extracted to extract the rectangles circumscribing each continuous region in a manner tracking that described above at step S64. Thereafter, control passes to step S65.

At step S65, a determination is made whether extraction of the line to be read is completed, i.e., whether any rectangles unprocessed for line extraction remain. If so, control passes to step S67, wherein line extraction according to the preferred embodiment is applied, as disclosed above in connection the description of the flowcharts contained within FIGS. 5 and 8. Control thereafter passes to step S66. In this manner, the line intended to be read by the user can be reliably extracted even when plural lines are simultaneously scanned.

If however, in step S65, it is determined that no unprocessed image data has not been line extracted, control instead passes to step S66. At step S66, a determination is made whether rectangles unprocessed for character type evaluation are present. As described above, these character types include centered characters, ascenders, and descenders. If this evaluation is unnecessary, control passes to step S68. If, however, character type identification is needed, control instead passes to step S69. At step S69, the character type evaluation process is executed, and detection and compensation of stepped pattern characters is then executed step S70. This character type evaluation and stepped pattern character detection and compensation process are executed according to the flow charts shown in FIGS. 10 and 13 and described hereinabove. Images scanned in a stepped pattern as shown in FIG. 25 as a result of scanning with the scanner wand moving at a right descending slope relative to the base line of the text with the scanner wand held perpendicular to the base line of the characters as shown in FIG. 24 can therefore be compensated Control thereafter passes to step S68.

At step s68. It is determined whether rectangles unprocessed for word extraction remain step S68. If there are, word extraction is applied in step S71. However, if there are no rectangles unprocessed for word extraction, control instead passes to step S72.

In step S72, a determination is made whether If there are word meanss unprocessed for skewed character compensation. If so, images scanned with the scanner wand held skewed (right or left) to the column direction are detected and compensated in step S73. This detection and compensation process is executed according to the techniques described in connection with the flowchart shown in FIG. 16 hereinabove. Control thereafter passes to step S76.

At step S76, a determination is made whether there are any image-processed and compensated words according to the preferred embodiment are ready to be extracted and recognized. If so, control passes to step S74, wherein character extraction in a known manner is applied. Thereafter, control passes to step S75, in which actual character recognition in a known manner is executed. Control thereafter loops back to step S61 and the above-described process executes for another block of scanned textual image data (if available).

As described hereinabove, the desired line can be reliably determined and extracted in images scanned with plural lines of meandering character strings. Images scanned in a stepped pattern can also be compensated after line evaluation when the images are scanned in a stepped pattern as a result of scanning the text image with the scanner wand or head moving at a right descending slope relative to the base line of the text with the scanner head held perpendicular to the base line of the characters. Furthermore, images scanned with the scanner head held skewed to the right (or left) relative to the column direction can also be detected and compensated.

Character recognition processing with a high recognition rate can therefore be achieved by applying the character extraction and character recognition processes to images compensated by means of the methods of the present invention as described above.

The foregoing disclosure and description of the invention are illustrative and explanatory thereof, and various changes in the size, shape, materials, components, circuit elements, wiring connections and contacts, as well as in the details of the illustrated circuitry, construction and method of operation may be made without departing from the spirit of the invention.

What is claimed is:

1. An image processing method for processing a document image including plural meandering text lines obtained through scanning a text document into a form enabling character extraction and character recognition thereof, the method comprising the steps of:

extracting a plurality of character images from a center area of the document image, the center area including a row-wise center line of the document image;

obtaining columnwise overlap between each extracted character image and character images adjacent thereto;

sequentially comparing the columnwise overlap ratios for the extracted character images against a minimum overlap threshold; and compiling a line image containing adjacent extracted characters whose respective columnwise overlap exceeds the minimum overlap threshold.

2. The image processing method according to claim 1 wherein the document image comprises multiple blocks of image data; and wherein each step of the method processes the document image on a per block basis.

3. An image processing apparatus for processing a document image including plural meandering text lines obtained through scanning a text document into a form enabling character extraction and character recognition thereof, comprising:

a scanner interface to receive the document image from a document scanner; and a line extractor in communication with said scanner interface to extract a plurality of character images from a center area of the document image and to determine as a text line to be read the meandering text line containing the extracted character images, said line extractor comprising:

a target line extractor coupled to said scanner interface to extract the character images in the center area of the document image and determine as the text line to be read as the meandering text line containing the extracted character images, the center area including a row-wise center line of the document image; and a target line tracking means in communication with said target line extractor for obtaining the overlap in the column direction between the extracted character images and character images adjacent thereto, for sequentially obtaining the overlap between adjacent extracted character images and for compiling a line image containing adjacent extracted characters whose respective mutual columnwise overlap exceeds a minimum overlap threshold.

4. An image processing apparatus according to claim 3, further comprising a circumscribing rectangle extractor in communication with said scanner interface and said target line extractor to extract a circumscribing rectangle for each character image contained within the document image, the circumscribing rectangle defining a starting coordinate and an ending coordinate diagonal to said starting coordinate.

5. An image processing method for processing a document image including plural meandering text lines obtained through scanning a text document into a form enabling character extraction and character recognition thereof, the method comprising the steps of:

extracting a plurality of character images from a center area of the document image;

compiling a text line comprising the extracted character images; and performing the following steps when a portion of the document image is scanned in a stepped pattern:

evaluating columnwise offsets between the extracted character images based on their respective positioning within the text line;

determining a columnwise inclination between the extracted characters based on the evaluated columnwise offsets obtained in said evaluating step; and compensating the character images within the stepped pattern portion of the document image based on the determined columnwise inclination obtained in said determining step.

6. The image processing method according to claim 5, wherein the document image includes a background image and plural character images, each character image being formed of at least one columnwise continuous run of picture elements contrasting with the background image of the document image; and wherein the method further comprises the step of converting each character image within the document image to corresponding run length data, the run length data including a starting coordinate and length of the columnwise continuous run forming the respective character image.

7. The image processing method according to claim 6, wherein said compensating step comprises compensating images by changing the starting coordinates of the run length data for the character images within the stepped pattern portion of the document image based on the determined columnwise inclination obtained in said determining step.

8. The image processing method according to claim 5, further comprising extracting a circumscribing rectangle defined by a starting coordinate and an ending coordinate diagonal thereto for each character image contained in the document image.

9. The image processing method according to claim 8, further comprising:

calculating a center coordinate for each character image based on the starting and ending coordinates of each respective circumscribing rectangle; and wherein said evaluation step evaluates columnwise offsets between the extracted character images based on their respective center coordinates.

10. The image processing method according to claim 5, wherein said two character images are the two closest character images estimated to be "centered" alphabetic characters when the character images represent the letters of the roman alphabet.

11. The image processing method according to claim 5, wherein the document image comprises multiple blocks of image data; and wherein each step of the method processes the document image on a per block basis.

12. An image processing apparatus for processing a document image including plural meandering text lines obtained through scanning a text document into a form enabling character extraction and character recognition thereof, comprising:

a scanner interface to receive the document image from a document scanner;

a line extractor in communication with said scanner interface to extract a plurality of character images from a center area of the document image and to determine as a text line to be read the meandering text line containing the extracted character images; and a stepped character pattern compensator in communication with said line extractor to:

evaluate columnwise offsets between the extracted character images based on their respective positioning within the text line;

determine a columnwise inclination between the extracted character images based on the evaluated columnwise offsets; and compensate the extracted character images based on the determined columnwise inclination.

13. The image processing apparatus according to claim 12, wherein the stepped character pattern compensator comprises a character type evaluator in communication with the line extractor to determine a letter type for each extracted character image, the letter type being selected from the group consisting of centered, ascender, and descender types; and a stepped character pattern compensating means in communication with said character type evaluator for compensating the extracted character images based on the determined columnwise inclination.

14. The image processing apparatus according to claim 12, wherein the document image includes a background image and plural character images, each character image being formed of at least one columnwise continuous run of picture elements contrasting with the background image of the document image; and wherein the imaging processing apparatus further comprises:

a run length data converter in communication with said scanner interface and said line extractor to convert each character image within the document image to corresponding run length data, the run length data including a starting coordinate and length of the columnwise continuous run forming its respective character image; and a circumscribing rectangle extractor in communication with scanner interface, said line extractor, and said run length data convertor to extract a circumscribing rectangle for each character image contained within the document image, the circumscribing rectangle defining a starting coordinate and an ending coordinate diagonal to said starting coordinate.

15. An image processing method for processing a document image including plural meandering text lines obtained through scanning a text document into a form enabling character extraction and character recognition thereof, comprising the steps of:

extracting a plurality of character images from a center area of the document image;

compiling a text line comprising the extracted character images;

changing an overall slope of the compiled text line having at least one character images positioned inclined to a column direction according to plural predefined angles;

determining as a desired angle to the column direction of the text image an angle wherein the width of the text image in a line direction is smallest; and compensating the inclined character image to the desired angle.

16. The image processing method according to claim 15, wherein the document image includes a background image and plural character images, each character image being formed of at least one columnwise continuous run of picture elements contrasting with the background image of the document image; and wherein the method further comprises the step of converting each character image within the document image to corresponding run length data, the run length data including a starting coordinate and length of the columnwise continuous run forming the respective character image.

17. The image processing method according to claim 16, wherein said changing step comprises:

changing the starting coordinates and length of the run length data corresponding to the inclined character image according to plural predefined angles; and obtaining the text image width in the line direction based on the converted starting coordinate and length of the run length data corresponding to the inclined character image.

18. An image processing method according to claim 16, wherein inclination compensation step compensates the columnwise inclination of the inclined character image by moving picture elements of the inclined character along the line direction.

19. The image processing method according to claim 15, further comprising extracting a circumscribing rectangle defined by a starting coordinate and an ending coordinate diagonal thereto for each character image contained in the document image.

20. The image processing method according to claim 15, wherein detection and inclination compensation steps are applied on a word means basis.

21. The image processing method according to claim 20, wherein the inclination compensation step applied to a current word is based on the columnwise inclination of a previous word when the number of character images forming the current is less than a predetermined number.

22. The image processing method according to claim 15, wherein the document image comprises multiple blocks of image data; and wherein each step of the method processes the document image on a per block basis.

23. An image processing apparatus for processing a document image including plural meandering text lines obtained through scanning a text document into a form enabling character extraction and character recognition thereof, comprising:

a scanner interface to receive the document image from a document scanner;

a line extractor in communication with said scanner interface to extract a plurality of character images from a center area of the document image and to determine as a text line to be read the meandering text line containing the extracted character images; and a skewed character compensator in communication with said line extractor to:

change the slope of the extracted text line having at least one character image inclined with respect to a column direction of the text line; changing an overall slope of the compiled text line having at least one character images positioned inclined to a column direction according to plural predefined angles;

determine as a desired angle to the column direction of the text image an angle wherein the width of the text image in a line direction is smallest; and compensate the inclined character image to the desired angle.

24. The image processing apparatus according to claim 23, wherein the document image includes a background image and plural character images, each character image being formed of at least one columnwise continuous run of picture elements contrasting with the background image of the document image; and wherein the imaging processing apparatus further comprises:

a run length data converter in communication with said scanner interface and said line extractor to convert each character image within the document image to corresponding run length data, the run length data including a starting coordinate and length of the columnwise continuous run forming its respective character image; and a circumscribing rectangle extractor in communication with scanner interface, said line extractor, and said run length data convertor to extract a circumscribing rectangle for each character image contained within the document image, the circumscribing rectangle defining a starting coordinate and an ending coordinate diagonal to said starting coordinate.

25. An article of manufacture, comprising:
a computer usable medium having computer readable code storage means embodied therein for processing a document image including plural meandering text lines obtained through scanning a text document into a form enabling character extraction and character recognition thereof, the computer readable program code storage means comprising:
computer readable program code to extract a plurality of character images from a center area of the document image, the center area including a row-wise center line of the document image;
computer readable program code to obtain columnwise overlap between each extracted character image and character images adjacent thereto;
computer readable program code to sequentially compare the columnwise overlap ratios for the extracted character images against a minimum overlap threshold; and
computer readable program code to compile a line image containing adjacent extracted characters whose respective columnwise overlap exceeds the minimum overlap threshold.

26. An article of manufacture, comprising:
a computer usable medium having computer readable code storage means embodied therein for processing a document image including plural meandering text lines obtained through scanning a text document into a form enabling character extraction and character recognition thereof, the computer readable code storage means comprising:
computer readable program code to extract a plurality of character images from a center area of the document image;
computer readable program code to compile a text line comprising the extracted character images;
computer readable program code to evaluate columnwise offsets between the extracted character images based on their respective positioning within the text line steps when a portion of the document image is scanned in a stepped pattern;
computer readable program code to determine a columnwise inclination between the extracted characters based on the evaluated columnwise offsets when a portion of the document image is scanned in a stepped pattern; and
computer readable program code to compensate the character images within the stepped pattern portion of the document image based on the determined columnwise inclination when a portion of the document image is scanned in a stepped pattern.

27. The article of manufacture according to claim 26, wherein
the document image includes a background image and plural character images, each character image being formed of at least one columnwise continuous run of picture elements contrasting with the background image of the document image; and
wherein the computer readable code storage means further comprises computer readable program code to convert each character image within the document image to corresponding run length data, the run length data including a starting coordinate and length of the columnwise continuous run forming the respective character image.

28. The article of manufacture according to claim 27, wherein said computer readable program code to compensate comprises code to change the starting coordinates of the run length data for the character images within the stepped pattern portion of the document image based on the determined columnwise inclination thereof.

29. The article of manufacture according to claim 26, further comprising computer readable program code to extract a circumscribing rectangle defined by a starting coordinate and an ending coordinate diagonal thereto for each character image contained in the document image.

30. The article of manufacture according to claim 29, further comprising:
computer readable program code to calculate a center coordinate for each character image based on the starting and ending coordinates of each respective circumscribing rectangle; and wherein
said computer readable code to evaluate comprises code to evaluate columnwise offsets between the extracted character images based on their respective center coordinates.

31. The article of manufacture according to claim 26, wherein said two character images are the two closest character images estimated to be "centered" alphabetic characters when the character images represent the letters of the roman alphabet.

32. An article of manufacture, comprising:
a computer usable medium having computer readable code storage means embodied therein for processing a document image including plural meandering text lines obtained through scanning a text document into a form enabling character extraction and character recognition thereof, the computer readable program code storage means comprising:
computer readable program code to extract a plurality of character images from a center area of the document image;
computer readable program code to compile a text line comprising the extracted character images;
computer readable program code to change an overall slope of the compiled text line having at least one character image positioned inclined to a column direction according to plural predefined angles;
computer readable program code to determine as a desired angle to the column direction of the text image an angle wherein the width of the text image in a line direction is smallest; and
computer readable program code to compensate the inclined character image to the desired angle.

33. The article of manufacture according to claim 32, wherein
the document image includes a background image and plural character images, each character image being formed of at least one columnwise continuous run of picture elements contrasting with the background image of the document image; and
wherein the computer readable code storage means further comprises computer readable program code to convert each character image within the document image to corresponding run length data, the run length data including a starting coordinate and length of the columnwise continuous run forming the respective character image.

34. The article of manufacture according to claim 33, wherein said computer readable program code to change comprises:

code to change the starting coordinates and length of the run length data corresponding to the inclined character image according to plural predefined angles; and code to obtain the text image width in the line direction based on the converted starting coordinate and length of the run length data corresponding to the inclined character image.

35. The article of manufacture according to claim 33, wherein said computer readable program code to compensate comprises code to compensate the columnwise inclination of the inclined character image by moving picture elements of the inclined character along the line direction.

36. The article of manufacture according to claim 32, further comprising computer readable program code to extract a circumscribing rectangle defined by a starting coordinate and an ending coordinate diagonal thereto for each character image contained in the document image.

37. The article of manufacture according to claim 32, wherein detection and inclination compensation are applied on a word unit basis.

38. The article of manufacture according to claim 37, wherein said computer readable program code to compensate is applied to a current word is based on the columnwise inclination of a previous word when the number of character images forming the current word is less than a predetermined number.

* * * * *

UNITED STATES PATENT AND TRADEMARK OFFICE
CERTIFICATE OF CORRECTION

PATENT NO.   : 5,781,660
DATED        : July 14, 1998
INVENTOR(S)  : Takashi Nitta, et al.

It is certified that an error appears in the above identified patent and that said Letters Patent is hereby corrected as shown below:

Title page, item number 30, Foreign Application Priority Data, change "Jul. 28, 1995" to --Jul. 28, 1994--.

Column 22, line 13, change "means" to --unit--.

line 18, insert --word-- after "current".

Signed and Sealed this

Thirteenth Day of October 1998

Attest:

Attesting Officer

BRUCE LEHMAN

Commissioner of Patents and Trademarks